US011539992B2

(12) United States Patent
Foerster et al.

(10) Patent No.: US 11,539,992 B2
(45) Date of Patent: Dec. 27, 2022

(54) AUTO-ADJUST PLAYBACK SPEED AND CONTEXTUAL INFORMATION

(71) Applicant: Google LLC, Mountain View, CA (US)

(72) Inventors: Jakob Foerster, Oxford (GB); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/908,481

(22) Filed: Feb. 28, 2018

(65) Prior Publication Data
US 2019/0268632 A1 Aug. 29, 2019

(51) Int. Cl.
*H04N 21/2387* (2011.01)
*H04N 21/25* (2011.01)
*H04N 21/845* (2011.01)
*H04N 21/6587* (2011.01)
*H04N 21/442* (2011.01)
(Continued)

(52) U.S. Cl.
CPC ..... *H04N 21/2387* (2013.01); *H04N 21/2408* (2013.01); *H04N 21/252* (2013.01); *H04N 21/44213* (2013.01); *H04N 21/44226* (2020.08); *H04N 21/6543* (2013.01); *H04N 21/6587* (2013.01); *H04N 21/8456* (2013.01)

(58) Field of Classification Search
CPC ............... H04N 21/2387; H04N 21/44213
See application file for complete search history.

(56) References Cited

U.S. PATENT DOCUMENTS 8,055,655 B1 * 11/2011 He ............... G06F 16/2477
707/727
8,230,343 B2 7/2012 Logan et al.
(Continued)

FOREIGN PATENT DOCUMENTS

CN 102907090 A 1/2013
EP 2 552 109 A1 1/2013
(Continued)

OTHER PUBLICATIONS

Chua ,et al., "Facilitating complex referencing of visual materials in asynchronous discussion interface", In Proceedings of the ACM on Human-Computer Interaction, vol. 1, Issue2, Article34, Nov. 2017, 19 pages, (Year:2017) (Year: 2017).*
(Continued)

*Primary Examiner* — Alfonso Castro
(74) *Attorney, Agent, or Firm* — Lowenstein Sandler LLP

(57) ABSTRACT

Implementations disclose methods and systems for providing a media item at an adjusted playback. A method includes receiving, from a first user device, a playback request from a first user for a first media item including one or more portions of media content; determining an adjusted playback for at least one portion of the first media item that is different than a default playback for the at least one portion of the first media item. The determining is based on previous playback behavior of one or more users in relation to one or more media items that each included one or more portions of media content corresponding to the one or more portions media content of the first media item; and causing the at least one portion of the first media item to be rendered on the first user device at the adjusted playback.

20 Claims, 12 Drawing Sheets

(51) Int. Cl.
*H04N 21/24* (2011.01)
*H04N 21/6543* (2011.01)

(56) References Cited

U.S. PATENT DOCUMENTS

| | | | | |
|---|---|---|---|---|
| 8,789,083 | B1* | 7/2014 | Landers | H04N 21/25891 |
| | | | | 725/10 |
| 8,843,951 | B1* | 9/2014 | Sherrets | H04N 21/472 |
| | | | | 709/224 |
| 8,942,542 | B1* | 1/2015 | Sherrets | H04N 21/44008 |
| | | | | 386/241 |
| 9,141,867 | B1* | 9/2015 | Matsuzuka | G06F 40/205 |
| 2009/0210779 | A1* | 8/2009 | Badoiu | G11B 27/105 |
| | | | | 715/230 |
| 2009/0297118 | A1* | 12/2009 | Fink | G06F 3/0482 |
| | | | | 386/278 |
| 2010/0050202 | A1* | 2/2010 | Kandekar | G06F 17/30244 |
| | | | | 725/14 |
| 2012/0143911 | A1* | 6/2012 | Liebald | G06F 16/337 |
| | | | | 707/771 |
| 2013/0104024 | A1* | 4/2013 | Rajkumar | G06F 16/70 |
| | | | | 715/234 |
| 2013/0151555 | A1 | 6/2013 | Miyano | |
| 2013/0246162 | A1 | 9/2013 | Brooks et al. | |
| 2014/0072285 | A1* | 3/2014 | Shynar | G11B 27/031 |
| | | | | 386/286 |
| 2014/0181634 | A1* | 6/2014 | Compain | G06F 40/166 |
| | | | | 715/234 |
| 2014/0282661 | A1* | 9/2014 | Martin | H04N 21/23424 |
| | | | | 725/18 |
| 2015/0370902 | A1* | 12/2015 | Oztaskent | G06F 16/435 |
| | | | | 707/770 |
| 2016/0142773 | A1 | 5/2016 | Terui | |
| 2016/0274744 | A1 | 9/2016 | Neumann et al. | |
| 2017/0024095 | A1 | 2/2017 | Glasgow | |
| 2017/0177718 | A1 | 6/2017 | Loganathan et al. | |
| 2017/0323018 | A1 | 11/2017 | Angelova et al. | |
| 2018/0039627 | A1* | 2/2018 | Reiley | G06F 16/437 |
| 2021/0266641 | A1* | 8/2021 | Selfors | H04N 21/8586 |

FOREIGN PATENT DOCUMENTS

| | | |
|---|---|---|
| GB | 2354089 A | 9/1999 |
| JP | 2001134706 A | 5/2001 |
| JP | 2009077046 A | 4/2009 |
| JP | 2009239322 A | 10/2009 |
| JP | 2011259154 A | 12/2011 |

OTHER PUBLICATIONS

International Search Report and Written Opinion dated Apr. 18, 2019, on application No. PCT/US2019/019654.

* cited by examiner

AUTO-ADJUST PLAYBACK SPEED AND CONTEXTUAL INFORMATION

TECHNICAL FIELD

Aspects and implementations of the present disclosure relate to media items and, in particular, playback of media items.

BACKGROUND

Media items, such as video items, audio items, etc., can be received by user devices from a server computing device. The user devices can perform playback of the media items.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Aspects of the present disclosure improve playback technology by providing media items at an adjusted playback. The media items are presented by a user device (e.g., personal computer, smart phone, tablet, etc.).

In an aspect of the disclosure, a method may include receiving, by a server computing device from a first user device, a playback request from a first user for a first media item including one or more portions of media content. The method may further include determining, by the server computing device, an adjusted playback for at least one portion of the first media item that is different than a default playback for the at least one portion of the first media item. The determining may be based on previous playback behavior of one or more users in relation to one or more media items that each included one or more portions of media content corresponding to the at least one or portion of media content of the first media item. The method may further include causing, by the server computing device, the at least one portion of the first media item to be rendered on the first user device at the adjusted playback.

BRIEF DESCRIPTION OF THE DRAWINGS

The present disclosure is illustrated by way of example, and not by way of limitation, in the figures of the accompanying drawings.

DETAILED DESCRIPTION

Figure 1A:
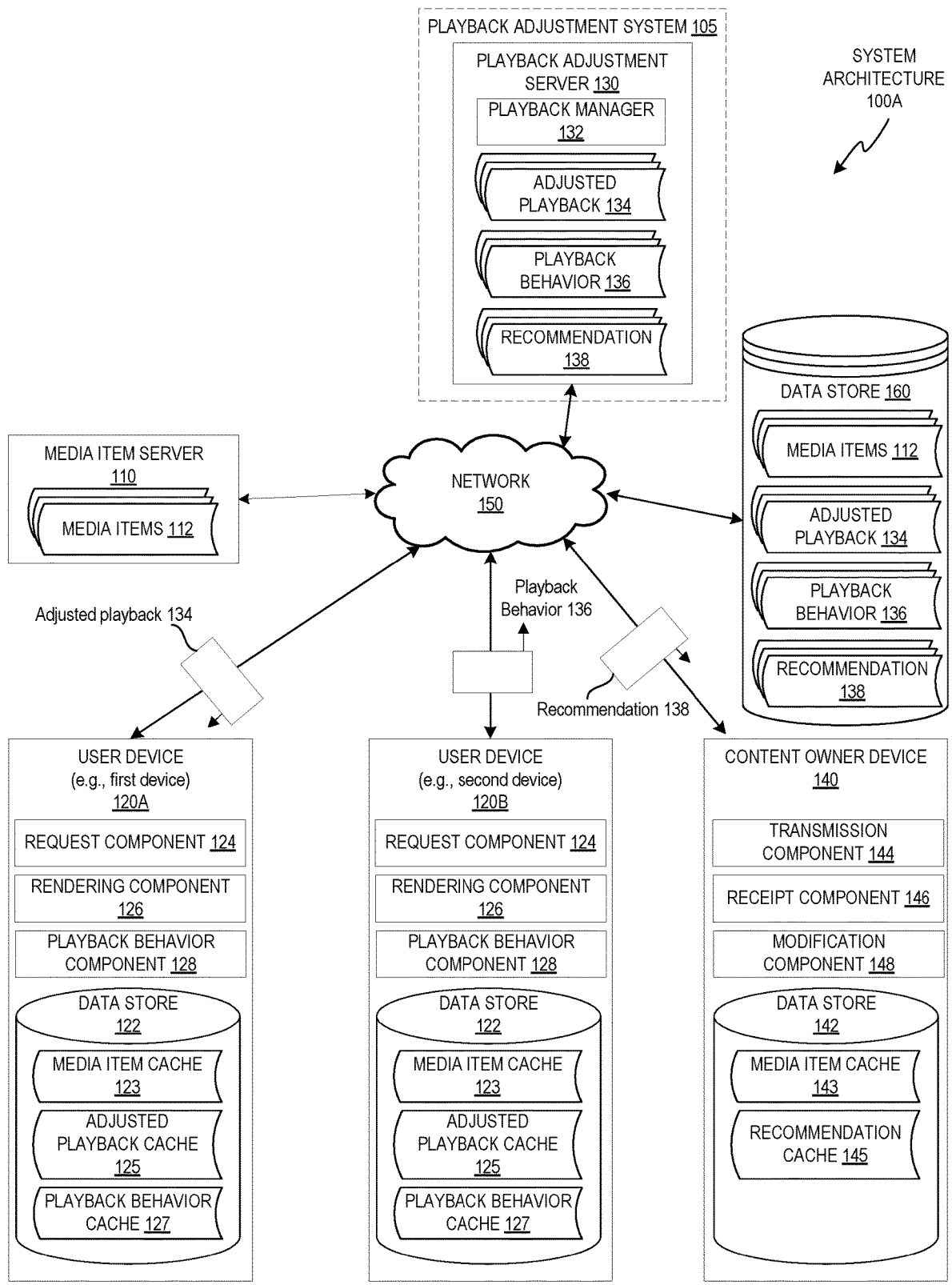
FIG. 1A is a block diagram illustrating an exemplary system architecture, in accordance with an implementation of the disclosure.

Aspects and implementations of the disclosure are directed to providing a media item at an adjusted playback. A media item, such as one or more of a video item, an audio item, a slideshow that switches slides over time, text that scrolls over time, figures that change over time, etc., may be rendered by a user device. The media item may be streamed from a media item server to the user device or the media item may be downloaded from the media item server onto the user device (e.g., offlined) to be rendered by the user device (e.g., at a later point in time).

A media item may have one or more portions that are unclear to users and/or one or more portions that are redundant for users, for example. A portion of a media that is unclear to a user may be a portion (e.g., segment) of the media item that the user is not able to understand (e.g., absorb) at the current playback speed and current level of abstraction. For example, the portion of the media item may include text, audio, or video that is too fast for the user to understand and/or may use concepts or terms with which the user is not familiar. To understand the portion of the media segment, the user may decrease the playback speed, replay the portion, and/or perform one or more searches. For example, in a first portion of a media item, a lecturer may speak rapidly and may use terms the user does not understand. The first portion of the media item may be unclear for the user (e.g., the user does not understand the portion of the media item without replaying and/or performing searches). A user may manually, via the user device, adjust playback of the media item during the portions that are unclear to the user by decreasing playback speed, replaying the unclear portions, or abandoning playback of the media item. A user may manually, via the user device, perform one or more searches in association with playback of the media item (e.g., search for explanatory information based on one or more portions of the media item that are unclear to the user).

A portion of a media item that is redundant to a user may be a portion (e.g., segment) of the media item that the user already understands. The portion of the media item may be too basic to keep the user engaged with the portion of the media item. For example, a twenty-minute media item may include basics of addition and subtraction for the first five minutes and advanced calculus concepts for the remaining fifteen minutes. The first five minutes may be redundant for a user that is familiar with basics of addition and subtraction. A user may manually, via the user device, adjust playback of the media item during the portions that are redundant for the user by increasing playback speed, skipping the redundant portions, or abandoning playback of the media item.

Encountering unclear portions and/or redundant portions, manually adjusting playback, and performing searches to clarify content may provide a poor user experience which may cause users to become bored, to become confused and frustrated, or to abandon playback of the media item. In addition, manually adjusting playback and performing searches may require additional processing overhead, additional required bandwidth, and so forth.

Aspects of the present disclosure address the above-mentioned and other challenges by providing media items at an adjusted playback. A server computing device may receive a playback request from a first user device for a media item. The media item may include one or more portions of media content that are deemed to be unclear or redundant to a first user associated with the first user device. A portion of media content may be deemed to be unclear or redundant if one or more users have previously tagged the portion as unclear or redundant, or if prior playback behavior of one or more users with respect to the portion indicates that the portion is likely to be unclear or redundant. For example, the portion may be deemed to be unclear if prior playback behavior includes decreasing playback speed for the portion or replaying the portion by one or more users. In another example, the portion may be deemed to be redundant if prior playback behavior includes increasing playback speed for the portion or skipping the portion by one or more users.

The server computing device may determine an adjusted playback for at least one portion of the media item (at least one portion that is deemed to be unclear or redundant), where the adjusted playback is different than a default playback for the at least one portion of the first media item. The determining may be based on previous playback behavior of one or more users in relation to one or more media items that each included one or more portions of media content (e.g., that were unclear and/or one or more corresponding portions that were redundant to the first user and/or to one or more other users) corresponding to the at least one portion of media content of the media item. The adjusted playback for the at least one portion of the media item may allow for clarification of the portions that are deemed to be unclear to the first user, may allow for a reduction in redundancy of the portions that are deemed to be redundant to the first user, etc. The server computing device may cause the first user device to render the at least one portion of the media item at the adjusted playback. The adjusted playback may involve, for example, a decreased playback speed, an increased playback speed, replaying, skipping, or displaying of contextual information at one or more portions of the media item, etc. The server computing device may generate a recommendation (e.g., in the form playback metadata or instructions) to modify the media item based on the previous playback behavior.

Providing media items at an adjusted playback, as disclosed herein, is advantageous because it improves user experience and provides technological advantages. Providing items at an adjusted playback reduces user confusion, user frustration, and the amount of time the user is bored during playback of media items. Providing media items at an adjusted playback also reduces the need for manual adjustments of playback and for performing of searches via a network connection. Aspects of the present disclosure result in technological advantages of significant reduction of required bandwidth, energy consumption (e.g., battery consumption), and latency.

In some implementations, the technological advantages may result from causing the user device to render the media item at the adjusted playback which does not require: the user device to receive user actions to adjust playback and the user device to transmit the user actions via a network to the server computing device; and the server computing device to process the user actions, adjust the playback or perform a search based on the user actions, and retransmit the media item at the adjusted playback or search results based on the user actions over the network to the user device.

In some implementations, the technological advantages may result from the user device receiving, from the server computing device, the media item and adjusted playback instructions (e.g., as part of playback metadata) and the user device rendering the media item at the adjusted playback based on the adjusted playback instructions without receiving user input and without communication with the server computing device via the network during playback of the media item.

The contextual information displayed in conjunction with the media item may include explanatory information in response to common searches performed by users over a network connection during previous playback. By receiving the media item and adjusted playback instructions (e.g., playback metadata) when the user device has network connection (e.g., an inexpensive network connection such as a Wi-Fi network connection instead of a cellular network connection), the contextual information including explanatory information resulting from common searches can be later displayed during adjusted playback of the media item without requiring the user device to have network connection (e.g., when the user device is not connected to the network, when the user device has a slow network connection, when the user device is connected over a more expensive network connection such as a cellular network connection instead of a Wi-Fi network connection).

In addition, aspects of the present disclosure result in significant reduction of required bandwidth, energy consumption (e.g., battery consumption), and latency because causing the user device to display the media item at the adjusted playback does not require that the user device maintain a persistent network connection to be able to render the media item and display explanatory information from common searches performed during previous playback.

FIG. 1 illustrates an example system architecture 100A, in accordance with one implementation of the disclosure. The system architecture 100A includes media item server 110, user device 120, playback adjustment server 130, content owner device 140, a network 150, and a data store 160. The playback adjustment server 130 may be part of a playback adjustment system 105.

Media item server 110 may be one or more computing devices (such as a rackmount server, a router computer, a server computer, a personal computer, a mainframe computer, a laptop computer, a tablet computer, a desktop computer, etc.), data stores (e.g., hard disks, memories, databases, etc.), networks, software components, and/or hardware components. The media item server 110 may be used to provide a user with access to media items 112. The media item server 110 may provide the media items 112 to the user (e.g., a user may select a media item 112 and download the media item 112 from the media item server 110 in response to requesting or purchasing the media item 112). Media item server 110 may be a part of a media item platform (e.g., a content hosting platform providing a content hosting service) that may allow users to consume, develop, upload, download, rate, share, search for, approve of ("like"), dislike, and/or comment on media items 112. The media item platform may also include a website (e.g., a webpage) or application back-end software that may be used to provide a user with access to the media items 112.

Media item server 110 may host content, such as media items 112. Media items 112 may be digital content chosen by a user, digital content made available by a user, digital content developed by a user, digital content uploaded by a user, digital content developed by a content owner, digital content uploaded by a content owner, digital content provided by the media item server 110, etc. Examples of media items 112 include, and are not limited to, video items (e.g., digital video, digital movies, etc.), audio items (e.g., digital music, digital audio books, etc.), advertisements, a slideshow that switches slides over time, text that scrolls over time, figures that change over time, etc.

Media items 112 may be consumed via a web browser on the user device 120 or via a mobile application ("app") that can be installed on the user device 120 via an app store. The web browser or the mobile app may allow a user to perform one or more searches (e.g., for explanatory information, for other media items 112, etc.). As used herein, "application," "mobile application," "smart television application," "desktop application," "software application," "digital content," "content," "content item," "media," "media item," "video item," "audio item," "contact invitation," "game," and "advertisement" can include an electronic file that can be executed or loaded using software, firmware or hardware configured to present the media item 112 to an entity. In one implementation, the media item platform may store the media items 112 using the data store 160. Media items 112 may be presented to or downloaded by a user of user device 120 from media item server 110 (e.g., a media item platform such as a content hosting platform). According to aspects of the disclosure, in response to a corresponding user action, playback speed of one or more portions of a media item 112 may be increased, playback speed of one or more portions of a media item 112 may be decreased, one or more portions of a media item 112 may be replayed, of one or more portions of a media item 112 may be skipped, contextual information may be displayed in conjunction with the media item 112, etc. Media items 112 may be played via an embedded media player (as well as other components) provided by a media item platform or stored locally. The media item platform may be, for example, an application distribution platform, a content hosting platform, or a social networking platform, and may be used to provide a user with access to media items 112 or provide the media items 112 to the user. For example, the media item platform may allow a user to consume, upload, search for, approve of ("like"), dislike, and/or comment on media items 112. Media item server 110 may be part of the media item platform, be an independent system or be part of a different platform.

In some implementations, system architecture 100A may also include a playback adjustment server 130 coupled to user device 120 and content owner device 140 via network 150 to facilitate providing adjusted playback of media items 112. In one implementation, playback adjustment server 130 may be part of the media item platform (e.g., the media item server 110 and playback adjustment server 130 may be part of the same media item platform). In another implementation, playback adjustment server 130 may be an independent platform including one or more computing devices such as a rackmount server, a router computer, a server computer, a personal computer, a mainframe computer, a laptop computer, a tablet computer, a desktop computer, etc.

Playback adjustment server 130 may include a playback manager 132. According to some aspects of the disclosure, the playback manager 132 may use past user actions (e.g., playback behavior 136) to determine adjusted playback for a media item 112. Alternatively the playback manager 132 may use a trained machine learning model 190 (see FIGS. 1B-C) to make such a determination. The trained machine learning model 190 may use deep reinforcement learning (e.g., reinforcement learning to adjust playback speed) (see FIGS. 1B-C). The deep reinforcement learning may use state representation of past user actions (e.g., playback behavior 136) and may treat the downstream watch time of the user as a reward. The actions may be setting the adjusted playback (e.g., reducing or increasing playback speed, skipping, replaying, displaying contextual information, etc.). The overall objective may be to keep the user engaged at a playback speed, level of information, and level of abstraction that is absorbable by the user (e.g., is not unclear, is not redundant, etc.).

Playback manager 132 may receive, from a user device 120, a playback request for a media item 112. In some implementations, the playback manager 132 determines that the media item 112 includes one or more portions of media content that are deemed to be unclear (e.g., based on previous playback behavior) to a user of the user device 120. In some implementations, the playback manager 132 determines that the media item 112 includes one or more portions of media content that are deemed to be redundant (e.g., based on previous playback behavior) for the user. In some implementations, the media item 112 may include one or more first portions that are deemed to be unclear to a user of the user device 120 and one or more second portions that are deemed to be redundant to the user of the user device 120. The playback manager 132 may determine an adjusted playback for at least one portion of the media item 112 that is different than a default playback for the at least one portion of the media item 112. The playback manager 132 may determine the adjusted playback based on playback behavior 136 of one or more users in relation to one or more media items (e.g., that each included one or more corresponding portions of media content that were unclear or redundant to the user of user device 120 or to one or more other users). The adjusted playback may allow for a clarification or reduction of redundancy of the one or more portions of the media item that are deemed to be unclear to or redundant for the user of user device 120. The playback manager 132 may cause the user device 120 to render the at least one portion of the media item 112 at the adjusted playback. In some implementations, the playback adjustment server 130, the media item server 110, or the media item platform streams the media item 112 to the user device 120 at the adjusted playback. In some implementations, the playback adjustment server 130 transmits adjusted playback instructions (e.g., playback metadata) to the user device 120 and the user device 120 renders the media item 112 at the adjusted playback based on the adjusted playback instructions.

Subsequent to causing the user device 120 to render the media item 112 at the adjusted playback based on the adjusted playback instructions, the playback adjustment server 130 may receive additional playback behavior 136 (e.g., based on adjustments to the playback) from the user device 120. The playback adjustment server 130 may update the adjusted playback based on the additional playback behavior 136. The playback adjustment server 130 may improve the adjusted playback of media item 112 as more users perform playback of the media item 112. For example, the adjusted playback may be periodically updated to reflect more accurate playback speed for the media item 112 based on additional playback behavior of the same or different users with respect to the media item 112.

The media item server 110, playback adjustment server 130, or media item platform may receive, from the content owner device 140, a media item 112. Playback manager 132 may identify playback behavior 136 of one or more users in relation to the media item 112 (e.g., media item 112 including one or more portions that are deemed to be unclear to or redundant for a user of the user device 120, etc.). The playback manager 132 may generate a recommendation 138 to modify the media item 112 based on the playback behavior 136. The playback manager 132 may transmit the recommendation 138 to the content owner device 140. The content owner device 140 may modify the media item 112 based on the recommendation 138. The media item server 110, playback adjustment server 130, or media item platform may receive, from the content owner device 140, the modified media item 112 (e.g., based on the recommendation 138). In some implementations, the playback manager 132 may generate the recommendation 138 to modify the media item 112 without causing a user device 120 to render the media item 112 at an adjusted playback (e.g., without generating adjusted playback instructions).

In some implementations, the data store 160 may store one or more of media items 112, indicators of adjusted playback 134, playback behavior 136, or recommendations 138. A media item 112 may include several portions and each portion may have an identifier (e.g., a segment identifier). Some portions may be associated with adjusted playback 134 (e.g., adjusted playback indicators). Adjusted playback 134 (e.g., adjusted playback indicator) may specify how playback of the respective portion should be modified (e.g., via an action identifier assigned to a particular action such as increased playback speed, skipped playback, decreased playback speed, repeated playback, etc.). Alternatively, adjusted playback 134 (e.g., adjusted playback indicator) may specify whether the portion is deemed unclear or redundant (e.g., using a value assigned to represent an unclear portion or a value assigned to represent a redundant portion), and the data store 160 may store a set of rules that specify how playback should be adjusted for a portion that is deemed unclear or redundant. Adjusted playback 134 (e.g., adjusted playback indicator) may be stored together with the media item 112 (e.g., as part of metadata) or separately from the media item 112 (e.g., in a separate database, repository or file). Adjusted playback instructions can include adjusted playback 134 (e.g., action identifier or action description) or be created based on adjusted playback 134 (e.g., if adjusted playback 134 specifies that the portion is deemed unclear or redundant, adjusted playback instructions are created using the set of rules that specify what action should be performed for the portion that is deemed unclear or redundant).

User devices 120A-B (herein referred to as user device 120) and content owner device 140 may include computing devices such as personal computers (PCs), laptops, mobile phones, smart phones, tablet computers, netbook computers, network-connected televisions ("smart TV"), network-connected media players (e.g., Blu-ray player), a set-top-box, over-the-top (OTT) streaming devices, operator boxes, etc. Content owner device 140 may be capable of transmitting (e.g., uploading) media items 112 to the media item server 110 over a network 150 and receiving recommendations 138 from the playback adjustment server 130 over the network 150. User devices 120 may be capable of receiving media items 112 from the media item server 110 over the network, receiving adjusted playback instructions from the playback adjustment server 130 over the network 150, and transmitting playback behavior 136 to the playback adjustment server 130 over the network 150. User device 120 may render media items 112 at an adjusted playback based on the adjusted playback instructions and may determine playback behavior 136 of the user of user device 120 in relation to the media items 112 independent of whether user device 120 is connected to the network 150 (e.g., while offline).

Network 150 may be a public network that provides user device 120 with access to media item server 110, playback adjustment server 130, and other publically available computing devices. Network 150 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, and/or a combination thereof.

Each user device 120 may include an operating system that allows users to render one or more portions of media items 112 at an adjusted playback. The media item 112 may be presented via a media viewer or a web browser. A web browser can access, retrieve, present, and/or navigate content (e.g., web pages such as Hyper Text Markup Language (HTML) pages, digital media items, text conversations, notifications, etc.) served by a web server. An embedded media player (e.g., a Flash® player or an HTML5 player) may be embedded in a web page (e.g., providing information about a product sold by an online merchant) or be part of a media viewer (a mobile app) installed on user device 120. In another example, the media item 112 may presented via a standalone application (e.g., a mobile application or app) that allows users to view digital media items (e.g., digital videos, digital audio, digital images, etc.).

In the example shown in FIG. 1, user device 120 may include one or more of a request component 124, a rendering component 126, a playback behavior component 128, and a data store 122. In some implementations, the one or more of the request component 124, rendering component 126, or playback behavior component 128 may be provided by a web browser or an application (e.g., mobile application, desktop application) executing on the user device 120.

Data store 122 may be a memory (e.g., random access memory), a drive (e.g., a hard drive, a flash drive), a database system, or another type of component or device capable of storing data. Data store 122 may include multiple storage components (e.g., multiple drives or multiple databases) that may span multiple computing devices (e.g., multiple server computers). The data store 122 may include a media item cache 123, an adjusted playback cache 125, and a playback behavior cache 127.

Request component 124 may receive user input (e.g., via a graphical user interface displayed via the user device 120) of a playback request for a media item 112. The request component 124 may transmit the playback request to one or more of the media item server 110, playback adjustment server 130, or media item platform. In some implementations, the request component 124 transmits a request for the media item 112 to the media item server 110 and a request for the adjusted playback instructions to the playback adjustment server 130. In some implementations, the request component 124 transmits the playback request to the playback adjustment server 130 and the playback adjustment server 130 transmits a request for the media item 112 to the media item server 110.

Rendering component 126 may receive the media item 112 from the media item server 110, playback adjustment server 130, or media item platform. The rendering component 126 may receive adjusted playback instructions from the playback adjustment server 130. In some implementations, the playback adjustment server 130 receives the playback request from the request component 124, the playback adjustment server 130 transmits a request for the media item 112 to media item server 110 and receives the media item 112 from the media item server 110, and the playback adjustment server 130 causes the rendering component 126 to render the media item 112 at the adjusted playback (e.g., the rendering component 126 receives the media item 112 and the adjusted playback instructions from the playback adjustment server 130).

The rendering component 126 may render the media item 112 at the adjusted playback based on the adjusted playback instructions. In some implementations, the media item 112 is streamed to the user device 120 (e.g., from the playback adjustment server 130, etc.) at the adjusted playback over the network 150 and the rendering component 126 causes the media item 112 at the adjusted playback to be displayed via the user device 120. In some implementations, the rendering component 126 receives the media item 112 and the adjusted playback instructions over the network 150 (e.g., from the playback adjustment server 130, etc.). The rendering component 126 may store the media item 112 in the media item cache 123 and the adjusted playback instructions in the adjusted playback cache 125. In some implementations, the rendering component 126 may cache the adjusted playback instructions with the media item 112. The rendering component 126 may retrieve the media item 112 and the adjusted playback instructions from the data store 122 and render the media item 112 at the adjusted playback based on the adjusted playback instructions without requiring a network connection over network 150.

In some implementations, the rendering, by the rendering component 126, of the media item 112 at the adjusted playback may be in response to or based on one or more user actions (e.g., rendering the media item 112 at the adjusted playback is conditional one or more user actions, the adjusted playback is based on previous playback behavior of one or more user actions). For example, the rendering component 126 may render one or more additional portions of the media item 112 at an increased speed (e.g., additional portions where a first speaker is speaking) in response to receiving a user action to increase a playback speed of a first portion of the media item 112 (e.g., a first portion where the first speaker is speaking). In another example, the rendering component 126 may render one or more portions of the media item 112 at a decreased playback speed of half of the default speed in response to determining that the user of the user device 120 has provided one or more user actions to decrease playback speed to half of the default speed for previous playback of corresponding portions of one or more media items.

In some implementations, the rendering component 126 may extrapolate in rendering the media item 112 at an adjusted playback. For example, the playback behavior of one or more other users is decreasing the speed to 25% for a portion of a first media item 112a and for a portion of a second media item 112b. The playback behavior of the user of user device 120 is decreasing the speed to 50% instead of 25% for the portion of the first media item 112a. The rendering component 126 may extrapolate and decrease the speed to 50% instead of 25% for the portion of the second media item 112b for the user of the user device 120.

In some implementations, the playback behavior component 128 may determine playback behavior 136 of the user of user device 120 in relation to the media item 112. For example, the playback behavior component 128 may determine playback behavior 136 including one or more of corresponding user action to decrease a playback speed of one or more portions of the media item 112, corresponding user action to increase a playback speed of one or more portions of the media item 112, corresponding user action to replay one or more portions of the media item 112, corresponding user action to skip one or more portions of the media item 112, corresponding user action to perform one or more searches associated with playback of the media item 112, etc. The playback behavior component 128 may store the playback behavior 136 in playback behavior cache 127 (e.g., when the user device 120 is not connected to the playback adjustment server 130 via network 150). The playback behavior component 128 may retrieve the playback behavior 136 from the playback behavior cache 127 and transmit the playback behavior 136 to the playback adjustment server 130. In some implementations, the playback behavior component 128 may transmit the playback behavior 136 to the playback adjustment server 130 in response to the user device 120 being connected to the playback adjustment server 130 via network 150. In some implementations, the playback behavior component 128 may transmit the playback behavior 136 to the playback adjustment server 130 periodically (e.g., at set intervals of time, a set time each day, etc.). In some implementations, the playback behavior component 128 may transmit the playback behavior 136 to the playback adjustment server 130 after performing playback of a media item 112. In some implementations, the playback behavior component 128 may transmit the playback behavior 136 to the playback adjustment server 130 as user actions are performed to adjust playback of the media item 112.

In the example shown in FIG. 1, content owner device 140 may include a transmission component 144, a receipt component 146, a modification component 148, and a data store 142.

Data store 142 may be a memory (e.g., random access memory), a drive (e.g., a hard drive, a flash drive), a database system, or another type of component or device capable of storing data. Data store 142 may include multiple storage components (e.g., multiple drives or multiple databases) that may span multiple computing devices (e.g., multiple server computers). The data store 142 may include a media item cache 143 and a recommendation cache 145.

Transmission component 144 may receive a media item 112 created by, modified by, to be uploaded by, or associated with the content owner associated with the content owner device 140. The transmission component 144 may store the media item 112 in the media item cache 143. The transmission component 144 may transmit (e.g., upload) the media item 112 to the media item server 110 (e.g., in response to content owner input to upload the media item 112).

The receipt component 146 may receive a recommendation 138 (e.g., based on playback behavior 136, adjusted playback instructions, etc.) from the playback adjustment server 130. The receipt component 146 may store the recommendation 138 in the recommendation cache 145.

The modification component 148 may modify the media item 112 based on the recommendation 138. The modification component 148 may retrieve the recommendation 138 from the recommendation cache 145. In some implementations, the modification component 148 may provide a report or analysis indicating one or more portions of the media item 112 and the corresponding user action. For example, the modification component 148 may provide a report indicating that users provide one or more of a corresponding user action to increase playback speed during a first portion of the media item 112, the users provide a corresponding user action to replay a second portion of the media item 112, and the users perform a search for explanatory information during a third portion of the media item 112. The modification component 148 may provide (e.g., via the report or analysis) suggested modifications to the media item 112. For example, the modification component 148 may suggest skipping the first portion, decreasing playback speed of the second portion, and providing contextual information in conjunction with the media item 112 (e.g., text overlaid on the media item 112) for the third portion. The modification component 148 may make the modifications to the media item 112 based on the recommendation 138. In response to content owner approval, the content owner device 140 may provide the modified media item 112 to one or more of the playback adjustment server 130, the media item server 110, or the media item platform. The modified media item may replace the previous media item 112.

In general, functions described in one implementation as being performed on the user device 120 can also be performed by the media item server 110 or playback adjustment server 130 in other implementations, if appropriate. For example, the playback adjustment server 130 may render the media item 112 at the adjusted playback and/or determine a playback behavior 136 of the user in relation to the media item 112.

Functions described in one implementation as being performed on the media item server 110 or playback adjustment server 130 can also be performed by the user device 120 in other implementations, if appropriate. For example, the user device 120 may identify previous playback behavior 136, determine adjusted playback 134 based on the playback behavior 136, generate a recommendation 138 to modify the media item 112, transmit the recommendation 138 to the content owner device 140, and/or receive a modified media item 112 from the content owner device 140 based on the recommendation 138.

In addition, the functions of a particular component can be performed by different or multiple components operating together. One or more of the media item platform, media item server 110, or playback adjustment server 130 can also be accessed as a service provided to other systems or devices through appropriate application programming interfaces (API), and thus is not limited to use in websites and applications.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline of the application distribution platform.

Although implementations of the disclosure are discussed in terms of a media item server 110, playback adjustment server 130, and a media item platform, implementations may also be generally applied to any type of social network providing content and connections between users.

Further to the descriptions above, a user may be provided with controls allowing the user to make an election as to both if and when systems, programs, or features described herein may enable collection of user information (e.g., information about a user's social network, social actions or activities, profession, a user's preferences, or a user's current location), and if the user is sent content or communications from a server (e.g., media item server 110 or playback adjustment server 130). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how the information is used, and what information is provided to the user.

Figure 1B:
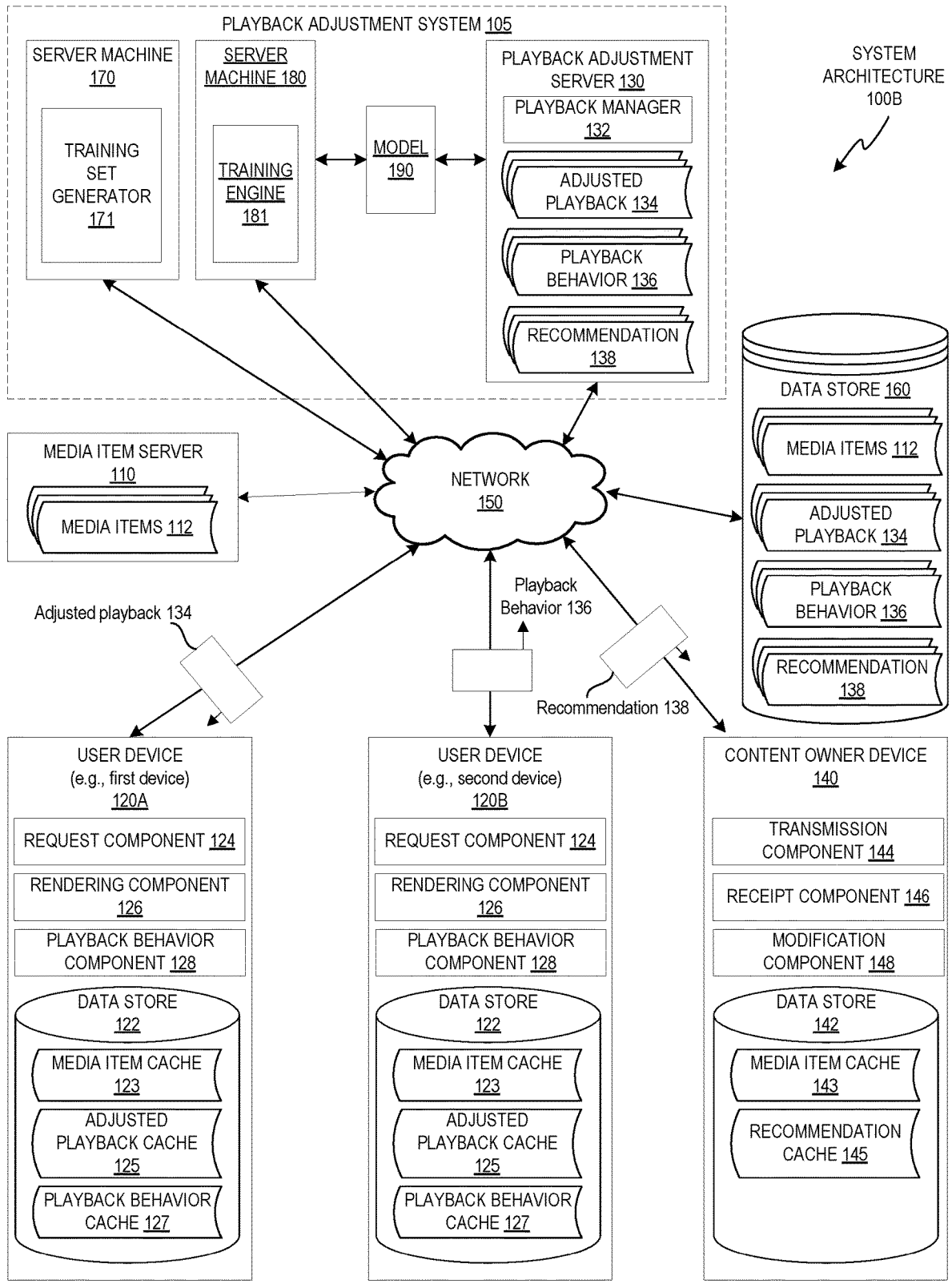
FIG. 1B is a block diagram illustrating an exemplary system architecture, in accordance with another implementation of the disclosure.

FIG. 1B is a block diagram illustrating an exemplary system architecture 100B, in accordance with another implementation of the disclosure. System 100B shows the playback adjustment system 105. The playback adjustment system 105 may include one or more of playback adjustment server 130, server machine 170, or server machine 180. System 100B may include similar components as system 100A, as described with respect to FIG. 1A. Components described with respect to system 100A of FIG. 1A may be used to help describe system 100B of FIG. 1B.

The server machines 170-180 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components.

Server machine 170 includes a training set generator 171 that is capable of generating training data (e.g., a set of training inputs and a set of target outputs) to train a machine learning model. Some operations of training set generator 171 are described in detail below with respect to FIG. 1C and FIG. 3E.

Server machine 180 includes a training engine 181 that is capable of training a machine learning model 190 using the training data from training set generator 171. The machine learning model 190 may refer to the model artifact that is created by the training engine 181 using the training data that includes training inputs and corresponding target outputs (correct answers for respective training inputs). Patterns in the training data can be found that map the training input to the target output (the correct answer), and the machine learning model 190 is provided that captures these patterns. The machine learning model 190 may be composed of, e.g., a single level of linear or non-linear operations (e.g., a support vector machine [SVM]) or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a backpropagation learning algorithm or the like. The machine learning model 190 may use deep reinforcement learning. For convenience, the remainder of this disclosure will refer to the implementation as a neural network, even though some implementations might employ an SVM or other type of learning machine instead of, or in addition to, a neural network.

In one aspect, the training set is obtained from server machine 170. Playback adjustment server 130 includes a playback manager 132 that provides current data (e.g., content information associated with media items 112, playback behavior 136, user information, etc.) as input to trained machine learning model 190 and runs trained machine learning model 190 on the input to obtain one or more outputs. As described in detail below with respect to FIG. 3D, in one implementation playback manager 132 is also capable of extracting an adjusted playback for rendering at least one portion of a media item 112 from the output of the trained machine learning model 190 and extracting confidence data from the output that indicates a level of confidence that at least one portion of a media item is to be rendered at the adjusted playback, and use the confidence data to decide to automatically render the at least one portion of the media item 112 at the adjusted playback (e.g., without user input to affirmatively adjust the playback).

In an implementation, confidence data may include or indicate a level of confidence of a user preference for an adjusted playback for at least a portion of a media item (e.g., an adjusted playback that will keep the user engaged at the playback speed, level of information, and level of abstraction that is absorbable by the user; an adjusted playback where the user does not manually further adjust the playback). In one example, the level of confidence is a real number between 0 and 1 inclusive, where 0 indicates no confidence a user prefers the adjusted playback for at least one portion of a particular media item and 1 indicates absolute confidence a user prefers the adjusted playback for the at least one portion of a particular media item.

As noted above, a user device 120 may transmit a playback request for a media item 112. Responsive to the playback request, the trained machine learning model 190 may be provided one or more of playback behavior 136 of one or more users in relation to one or more media items, content information associated with the one or more media items, or user information associated with the one or more users. For instance, content information may be used as first input to the trained machine learning model 190, playback behavior may be used as second input, user information may be used as third input, and so forth.

In implementations, the content information used as input to the trained machine learning model 190 may include information with respect to the current media item 112 that corresponds to the playback request. In implementations, the playback behavior used as input to the trained machine learning model 190 may include information with respect to playback behavior of the user that submitted the playback request. In implementations, the user information used as input to the trained machine learning model 190 may include information with respect to the user that submitted the playback.

The trained machine learning model 190 may produce an output that indicates an adjusted playback for the media item 112, and a level of confidence for a preference of the user for the adjusted playback (e.g., a level of confidence that the user will not further adjust the playback of the media item 112). Playback adjustment server 130 may determine whether to use the adjusted playback based on the level of confidence. As noted above, the playback adjustment server 130 may cause the user device to automatically render the media item 112 at the adjusted playback based on the level of confidence. In some implementations, a recommendation may be sent to the user device, suggesting that the media item 112 should be rendered at a particular adjusted playback.

In some implementations, playback adjustment server 130 may implement a playback manager 132 to provide the adjusted playback of media items 112. In implementations, the playback manager 132 may be a stand-alone application. In some implementations, an adjusted playback may be enabled via an interface component, electronic message, prompt, etc. that provides a user with personalized adjusted playback (for at least one portion of a media item) that may appeal to a user. Adjusted playback instructions may be created based on the adjusted playback as discussed in more detail above. Adjusted playback instructions may identify an action such as skipping, replaying, increased playback speed, decreased playback speed, displaying contextual information, etc.

In some implementations, training set generator 171 may generate training data to train a machine learning model using default playback of a media item and user input to adjust the playback of the media item (or using a determined adjusted playback of a media item and user input to further adjust the playback of the media item). For example, a media item may be rendered at a default playback on a user device. The user device may provide user interface elements that allow the user to provide user input to skip portions of the media item, replay portions of the media item, increase playback speed of the media item, decrease playback speed of the media item, perform searches, etc. The user selection of a user interface element (to adjust playback) may be used as target output data to train the machine learning model.

Once the machine learning model is trained, the trained machine learning model 190 can be used to provide an output identifying an adjusted playback for a currently requested media item (not included in the training set with respect to a requesting user), and a level of confidence associated with the adjusted playback for such media item, where the level of confidence indicates a preference of the user to render the media item at the adjusted playback. In some implementations, responsive to a low level of confidence (e.g., the confidence score is below a threshold level of confidence), a prompt may be sent to the user device 120 (e.g., "Do you want to play the media item at the adjusted playback?"). In some implementations, responsive to a high level of confidence (e.g., if the confidence score exceeds or is equal to a threshold level of confidence), a default action can instead be taken (e.g., automatically rendering at least one portion of the media item at the adjusted playback). In some implementations, the default action may be taken and the user may be given an opportunity to undo the default action. For example, the user may be prompted "We are rendering at least one portion of the media item at the adjusted playback [Undo]."

In some implementations, the prompt may include an indication of details of the adjusted playback (e.g., skipping, changing playback speed, display of contextual information, etc.). For example, "Do you want to increase playback speed of the media item?"

In implementations, the user may access playback adjustment server 130 through a user account. The user may access (e.g., log in to) the user account by providing user account information (e.g., username and password) via an application on user device 120. In some implementations, the user account may be associated with a single user. In some implementations, user activity (e.g., playback behavior) associated with the user account may be recorded and used as input to train the machine learning model (e.g., training engine 181), or as input to the trained machine learning model 190. In other implementations, the user account may be a shared account (e.g., family account shared by multiple users) (also referred to as "shared user account" herein). The shared account may have multiple user profiles, each associated with a different user. The multiple users may login to the shared account using the same account information or different account information. In some implementations, the multiple users of the shared account may be differentiated based on the different user profiles of the shared account. In implementations, user activity (e.g., playback behavior) associated with the different user profiles of a shared account may be recorded and used as input to train the machine learning model (e.g., training engine 181), or as input to the trained machine learning model 190.

Figure 1C:
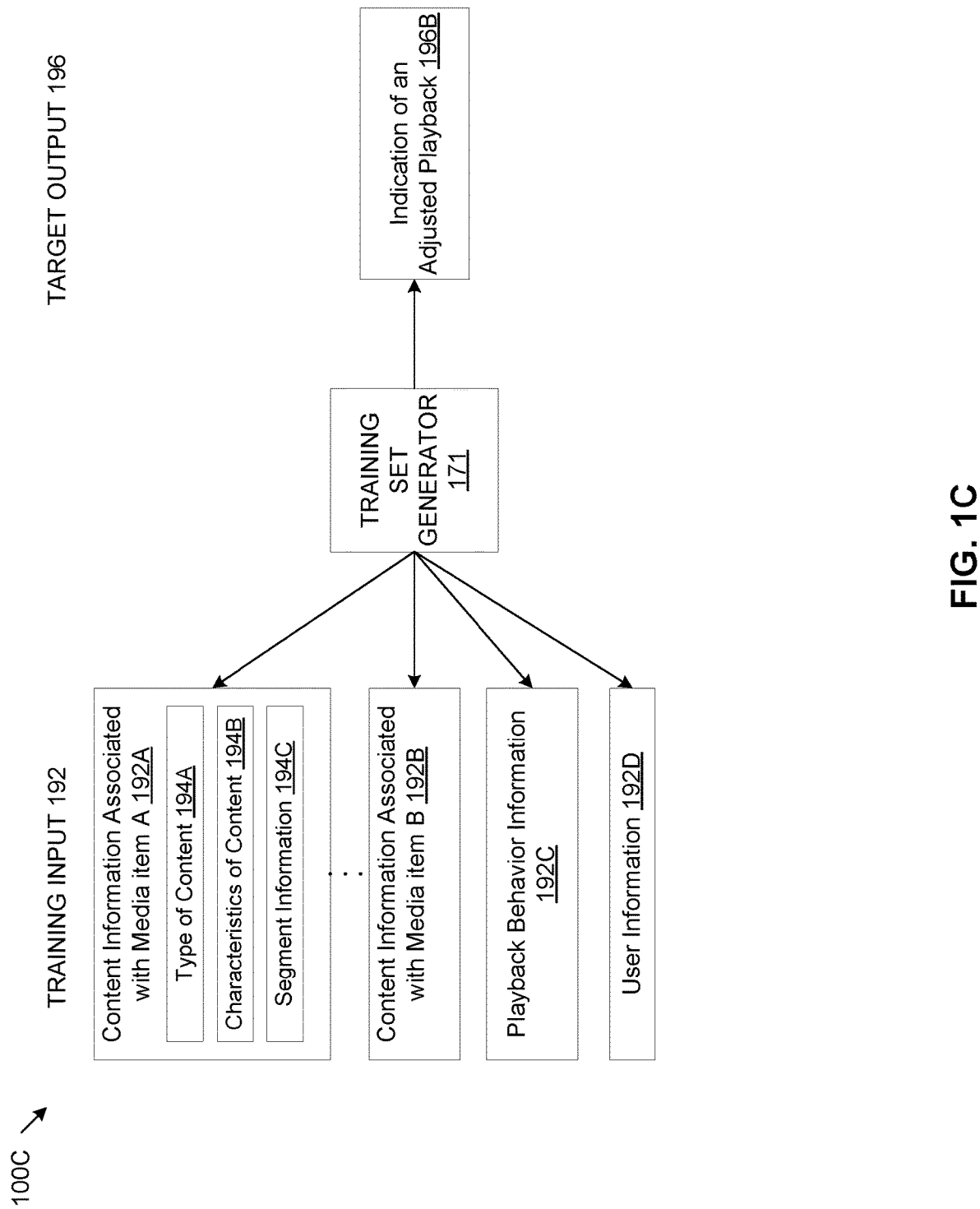
FIG. 1C is an example training set generator to create training data for a machine learning model using information pertaining to playback of media items on user devices, in accordance with an implementation of the disclosure.

The machine learning model 190 may be trained using the training inputs 192 and target outputs 196 described herein (see FIG. 1C). The trained machine learning model may then be used to determine an adjusted playback for at least one portion of a media item. Rendering of the at least one portion of the media item may be performed in several ways. For example, the media item and adjusted playback instructions may be downloaded on a user device 120 and the user device 120 may render the media item 112 at the adjusted playback based on the instructions (e.g., when offline). In another example, the playback adjustment server 130 may stream the media item 112 at the adjusted playback to the user device 120.

Also as noted above, for purpose of illustration, rather than limitation, aspects of the disclosure describe the training of a machine learning model and use of a trained machine learning model using information pertaining to playback of one or more media items 112 on one or more user devices 120 to determine an adjusted playback for at least one portion of a media item 112. In other implementations, a heuristic model or rule-based model is used to determine an adjusted playback for at least one portion of a media item 112. In some implementations, playback adjustment server 130 may determine or monitor playback behavior 136 of user devices. For example, one or more user devices may decrease playback speed of portions of media items when a particular speaker is talking. Playback adjustment server 130 may monitor for information such as playback behavior 136, content information, user information, etc. It may be noted that any of the information described with respect to training inputs 192 of FIG. 1C may be monitored or otherwise used in the heuristic or rule-based model. Playback adjustment server 130 may score each adjusted playback per portion of media item 112 (e.g., the first five minutes have an increased playback speed of twice the default playback speed nine out of ten times and a decreased playback speed of half the default playback speed one out of ten times). The scores associated with each adjusted playback for a portion of media content may be compared across multiple media items 112 including the portion, and the adjusted playback with the highest score may be used (e.g., increasing playback speed of twice the default playback speed). In other implementations, the scores associated with each adjusted playback may be compared to a threshold (e.g., a threshold of seven out of ten times). If the score exceeds the threshold, the at least one portion of a media item 112 may be rendered at the adjusted playback.

It should be noted that in some other implementations, the functions of server machine 170, server machine 180, playback adjustment server 130, or media item server 110 may be provided by a fewer number of machines. For example, in some implementations server machines 170 and 180 may be integrated into a single machine, while in some other implementations server machine 170, server machine 180, and playback adjustment server 130 may be integrated into a single machine. In addition, in some implementations one or more of server machine 170, server machine 180, and playback adjustment server 130 may be integrated into the media item server 110.

In general, functions described in one implementation as being performed by the media item server 110, server machine 170, server machine 180, or playback adjustment server 130 can also be performed on the user devices 120 in other implementations, if appropriate. In addition, the functionality attributed to a particular component can be performed by different or multiple components operating together. The media item server 110, server machine 170, server machine 180, or playback adjustment server 130 can also be accessed as a service provided to other systems or devices through appropriate application programming interfaces, and thus is not limited to use in websites.

FIG. 1C is an example training set generator to create training data for a machine learning model using information pertaining to playback of media items on user devices, in accordance with an implementation of the disclosure. System 100C shows training set generator 171, training inputs 192, and target outputs 196. System 100C may include similar components as systems 100A-B, as described with respect to FIGS. 1A-B. Components described with respect to systems 100A-B of FIGS. 1A-B may be used to help describe system 100C of FIG. 1C.

In implementations, training set generator 171 generates training data that includes one or more training inputs 192, and one or more target outputs 196. The training data may also include mapping data that maps the training inputs 192 to the target outputs 196. Training inputs 192 may also be referred to as "features," "attributes," or "information." In some implementations, training set generator 171 may provide the training data in a training set, and provide the training set to the training engine 181 where the training set is used to train the machine learning model 190. Some implementations of generating a training set may further be described with respect to FIG. 3E.

In one implementation, training inputs 192 may include one or more of content information 192A associated with a media item (e.g., media item A), additional content information 192B associated with another media item, playback behavior information 192C (playback behavior 136) of one or more users in relation to one or more media items, or user information 192D. It may be noted that content information, such as content information 192A, may be obtained for any number of media items (e.g., content information 192A-B may include any number of media items). In some implementations, the content information 192A associated with a media item (hereinafter referred to as "content information") may be organized on a per media item basis. In other implementations, the content information may include similar information organized on another basis.

In implementations, content information 192A may include categories 194 of content information that is also organized on a per media item basis. Categories 194 of content information may include, but is not limited to, type of content 194A of media item A, characteristics of content 194B of media item A, and segment information 194C (e.g., temporal location of segment) with respect with media item A. Content information 192B may include similar categories 194 of content information as content information 192A. It may also be noted that content information and categories of content information may be included for any number of media items. It may also be noted that one or more categories 194 of content information may be used as training inputs 192.

For the sake of illustration, rather than limitation, the training inputs 192 and target outputs 196 to train a machine learning model, include information for particular user accounts. Similarly, inputs to the trained machine learning model 190 may include information for particular user accounts to allow the trained machine learning model 190 to determine outcomes (e.g., whether adjust the playback) for a specific user account or specific user profile of the user account. In other implementations, the information used to train the machine learning model may be from specific groups of user accounts having specific characteristics (e.g., user accounts with users from a particular geographic region, clusters of user accounts, etc.) and allow the trained machine learning model 190 to determine outcomes for a specific group of user accounts based on input for a certain user account sharing characteristics of the specific group. In still other implementations, the information used to train the machine learning model may be for all user accounts and allow the trained machine learning model 190 to determine outcomes for all user accounts based on input for a specific user account.

In implementations, training inputs 192 may include content information 192A. Content information may refer to information regarding content of the media item.

In implementations, content information 192A may include type of content 194A. Type of content 194A may include the format of the media item. For example, the format of the media item may include one or more of a video item, an audio item, a slideshow that switches slides over time, text that scrolls over time, figures that change over time, etc.

In implementations, content information 192A may include characteristics of content 194B. Characteristics of content 194B may include genre of the content (e.g., comedy shows, educational videos, news, lectures, etc.), particular people that are speaking or depicted in the content, subject matter of the content, subjects discussed in the content, etc.

In implementations, content information 192A may include segment information 194C. Segment information 194C may include a first temporal location where a portion of the media item starts and a second temporal location where the portion of the media item ends. For example, a lecturer may start speaking at the first temporal location of 30 seconds from the beginning of the media item and the lecturer may end speaking at the second temporal location of 10 minutes from the beginning of the media item.

In some implementation, training inputs 192 may include playback behavior information 192C (e.g., playback behavior 136). The playback behavior information 192C may include playback behavior 136 of one or more users in relation to portions of one or more media items. As discussed above, playback behavior 136 may include one or more of skipping one or more portions of a media item, replaying one or more portions of a media item, an increased playback speed of one or more portions of a media item, a decreased playback speed of one or more portions of a media item, searching during playback of one or more portions of a media item, pausing playback of one or more portions of a media item, abandoning playback of the media item, etc.

Playback behavior information 192C may further include user feedback, user browsing actions, user inputs (e.g., starting playback, pause, fast forward, rewind, replay, etc.), viewing history, and user inactivity (e.g., no user inputs), or timestamps for all of the aforementioned (e.g. start time of each stream or download, time of user inputs with respect to each stream). Playback behavior information 192C may further include information indicative of the context in which the one or more users came to access the media item (e.g. via a browser for accessing the website, via a native application, through an intent icon, etc.), the time of day of the access, information about media content viewed, streamed, or downloaded (e.g., genre, length, title, artist, type such as video item, audio item, etc.), for example.

In some implementations, playback behavior information 192C may also include information indicating usage patterns or habits with respect to consumption of media items. Information indicating usage patterns or habits may indicate a user's usage pattern with respect to content information with similar characteristics (e.g., characteristics of content 194B) or of similar types (type of content 194A). For example, information indicating usage patterns or habits may indicate that a user decreases playback speed (e.g., to a 0.5 playback speed) responsive to user input for portions of media items corresponding to a particular lecturer. In another example, information indicating usage patterns or habits may indicate whether or not the user was prompted to choose whether to render the at least one portion of a media item at an adjusted playback, and if the user was prompted, which text was used in the prompt. Information indicating usage patterns or habits may be useful for avoiding biases that might crop up in whether the user chose to render the at least one portion of the media item at the adjusted playback, based on what the system made easier as a default.

In implementations, training inputs 192 may include user information 192D. User information 192D may refer to information regarding types of users that access the media item server 110 or playback adjustment server 130. For example, user information 192D may include user affinities. An affinity may refer to user interest in a particular category (e.g., news, video games, college basketball, etc.) of media item. An affinity score (e.g. a value 0-1, low to high) may be assigned to each category to quantify user interest in a particular category. For example, a user may have an affinity score of 0.5 for college basketball and an affinity score of 0.9 for video gaming. For example, a user may be logged in (e.g., account name and password) to the media item server 110 or playback adjustment server 130, and the user information 192D may be associated with the user account. In another example, a cookie may be associated with a user, user device, or application and the user information 192D may be determined from the cookie. In implementations, user information 192D may include the user information of some or all the users of a shared user account.

It may be noted that determining whether to render at least one portion of a media item at an adjusted playback may be accomplished in many different ways. For example, if a user is using a browser, the particular user device or user account may be determined using a cookie, a user agent, or fingerprint information to identify the particular user device or user account. If a native application is being used to access the media item server 110, the native application may query the operating system of the user device and gather information to distinguish the particular user device or user account.

In some implementations, user information 192D may include location information. Location information may include geolocation information, proximity information, or contextual location information. Geolocation information may refer to information that allows for the identification or estimation of a real-world geographic location of the user device. For example, the geolocation information may be an address, a street, a city, a county, a state, etc. Geolocation information may be determined using a global positioning system (GPS) device, an internet protocol (IP) address, among others.

In implementations, target outputs 196 may include an indication of an adjusted playback 196B (e.g., an indication of a preference of a user to render at least one portion of the media item at the adjusted playback). In some implementations, an indication of a preference of an adjusted playback may include a user selection to adjust playback of at least one portion of a media item. As described above, the user selection to adjust playback may be facilitated by recommendations. An indication of an adjusted playback 196B may also include information about the media item, information about the playback behavior, and information about the user.

In some implementations, subsequent to generating a training set and training machine learning model 190 using the training set, the machine learning model 190 may be further trained (e.g., additional data for a training set) or adjusted (e.g., adjusting weights associated with input data of the machine learning model 190, such as connection weights in a neural network) using user selection to adjust playback of one or more portions of one or more media items. For example, after a training set is generated and machine learning model 190 is trained using the training set, the training engine 181 may receive an indication that at least one portion of a media item of a playback request corresponds to one or more portions of one or more media items, and may use the machine learning model 190 to generate a test output that identifies an adjusted playback for at least one portion of the media item. The system 100 causes the user device to render at least one portion of the media item at the adjusted playback. The system 100 may receive user selection to further adjust playback of one or more portions of the media item (e.g., playback behavior) and use this information to further train or adjust machine learning model 190.

Figure 2:
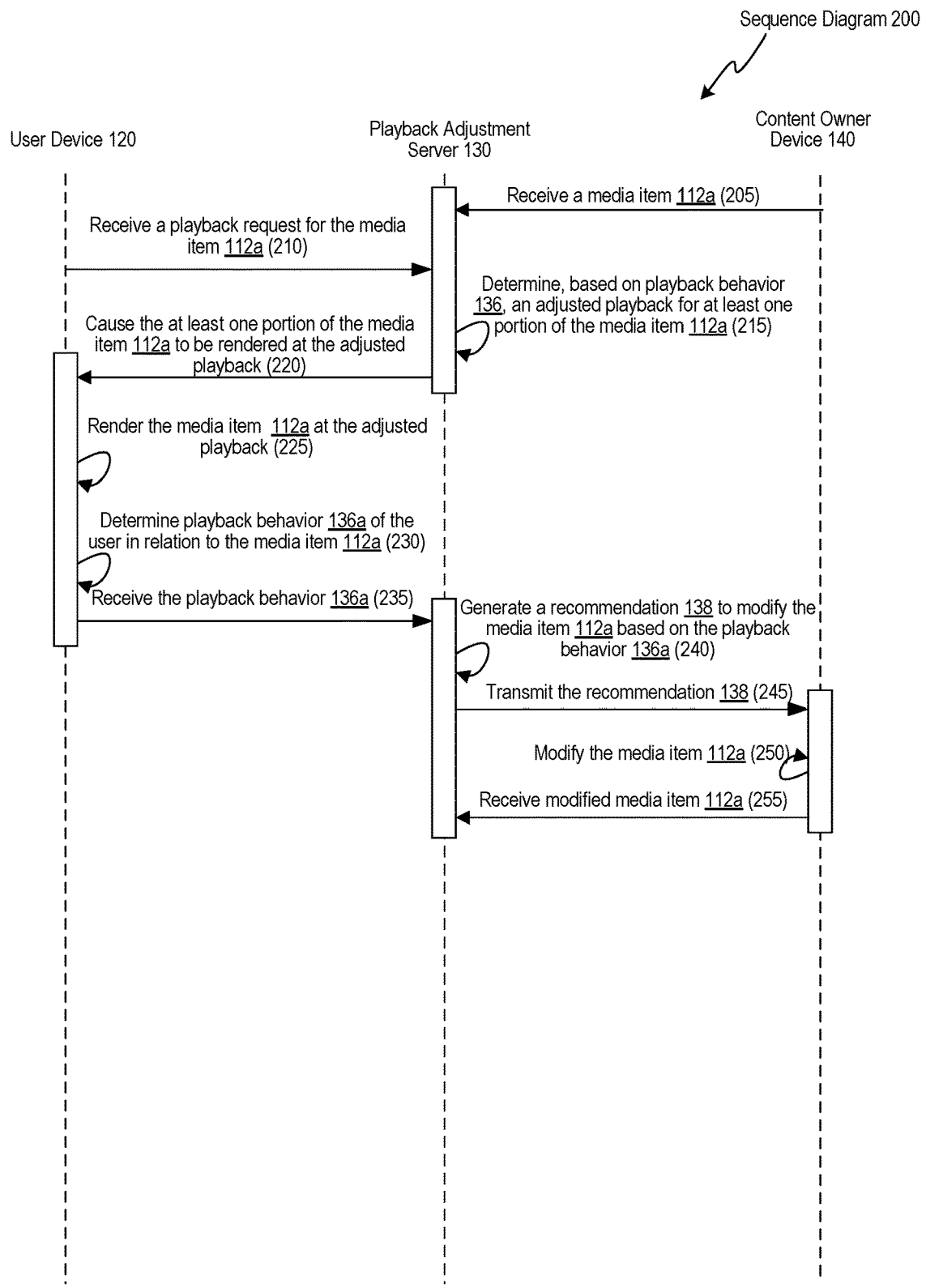
FIG. 2 is a sequence diagram for providing a media item at an adjusted playback, in accordance with an implementation of the disclosure.

FIG. 2 depicts a sequence diagram 200 for providing a media item 112 at an adjusted playback, in accordance with an implementation of the disclosure. As depicted, the sequence diagram 200 includes interactions between user device 120, playback adjustment server 130, and content owner device 140. One or more of the acts depicted in sequence diagram 200 as being carried out by the playback adjustment server 130 may be carried out by one or more of the playback adjustment server 130, the media item server 110, or the media item platform. In some implementations, the media item server 110 and/or playback adjustment server 130 are part of a media item platform. In some implementations, there may be one or more intervening components or acts between those acts shown in sequence diagram 200. In some implementations, a media item 112 may be provided at an adjusted playback with fewer acts than those depicted in sequence diagram 200.

The sequence diagram 200 may begin, at operation 205, with the playback adjustment server 130 receiving a media item 112a from the content owner device 140. In some implementations, the content owner device 140 transmits the media item 112a to the playback adjustment server 130. In some implementations, the content owner device 140 transmits the media item 112a to the media item server 110 and playback adjustment server 130 receives the media item 112a from the media item server 110. In some implementations, the content owner device 140 transmits the media item 112a to the media item server 110 and playback adjustment server 130 receives an indication from the media item server 110 that the media item 112a is stored on the media item server 110 or in the data store 160.

At operation 210, the playback adjustment server 130 may receive a playback request for the media item 112a from the user device 120. In some implementations, the media item 112a may include one or more portions that are deemed to be unclear to the user of the user device 120. In some implementations, the media item 112a may include one or more second portions that are deemed to be redundant to the user of the user device 120. In some implementations, the user of user device 120 performs a login with the playback adjustment server 130, media item server 110, or media item platform prior to sending the playback request.

The playback adjustment server 130 may have access to one or more of previous playback behavior (e.g., viewing history, scrolling history, search history) of the user or information about the user (e.g., demographics, groups of which the user is a member, etc.) in response to the user logging in. In some implementations, the previous playback behavior 136 and/or user information of the user may be used to determine that at least one portion of the media item 112a is deemed to be unclear or redundant to the user. For example, if the user has decreased playback speed of other portions of other media items that include a particular lecturer, the playback adjustment server 130 may find at least one portion of media item 112a that includes the same lecturer to be deemed to be unclear. In another example, if the user has been clustered (e.g., has similar user information and/or playback behavior 136) with other users that have increased playback speed of portions of media items about a particular subject (e.g., basic addition and subtraction), the playback adjustment server 130 may determine that at least one portion of media item 112a that is also about the same subject (e.g., basic addition and subtraction) to be deemed to be redundant. In some implementations, the adjusted playback is default for a media item 112 regardless of previous playback behavior and/or user information of the user.

At operation 215, the playback adjustment server 130 may determine, based on previous playback behavior 136 of one or more users in relation to one or more media items 112, an adjusted playback for at least one portion of the first media item 112a. In some implementations, the playback request is for a media item 112a that has one or more corresponding portions that are deemed to be unclear to the user and the playback adjustment server 130 may identify one or more media items that have one or more corresponding portions that were unclear to the first user or to one or more other users (e.g., for example, a first portion of a first media item, a second and a third portion of a second media item, etc.). In some implementations, the playback request is for a media item 112a that has one or more corresponding portions that are deemed to be redundant for the user and the playback adjustment server 130 may identify one or more media items that have one or more corresponding portions that were redundant to the first user or to one or more other users.

In some implementations, the playback adjustment server 130 may determine that the one or more other users (e.g., corresponding to the previous playback behavior) are similar to the user of user device 120. The playback adjustment server 130 may cluster the user of user device 120 with the one or more other users (e.g., based on similar playback behavior). For example, the playback adjustment server 130 may cluster the user of user device 120 with one or more other users based on a similar viewing history (e.g., the one or more other users watch a threshold amount of the same media items as the user). In another example, the playback adjustment server 130 may cluster the user of user device 120 with one or more other users based on a similar scrolling history (e.g., similar playback behavior for one or more other media items, skipping or repeating similar portions of the media items). In some implementations, the playback adjustment server 130 may cluster the user of user device 120 with one or more other users based on other similar characteristics (e.g., adults vs children, geographic location, etc.) (e.g., without matching playback behavior 136, in addition to matching playback behavior 136). In some implementations, the playback adjustment server 130 may cluster the user of user device 120 with one or more other users based on being part of the same group (e.g., subscribing to the same channel, being part of the same social networking group, etc.).

In one implementation, the playback adjustment server 130 may cluster, based on similar playback behavior 136, the user of user device 120 with a second user in a first cluster. The playback adjustment server 130 may identify second playback behavior of the second user in relation to one or more portions of the media item 112a. The playback adjustment server 130 may determine an adjusted playback of one or more portions of the media item 112a based on the second playback behavior.

In some implementations, the playback adjustment server 130 identifies previous playback behavior of the user of user device 120 in relation to one or more media items that have similarities to the media item 112a. In some implementations, the playback adjustment server 130 identifies previous playback behavior of one or more other users in relation to the media item 112a. In some implementations, the playback adjustment server 130 identifies previous playback behavior of one or more other users in relation to one or more media items that have similarities to the media item 112a.

In some implementations, the playback adjustment server 130 monitors the previous playback behavior 136 of the one or more users during streaming of one or more media items 112 to the corresponding one or more user devices 120. In some implementations, the playback adjustment server 130 may receive previous playback behavior 136 from the one or more user devices 120 (e.g., after the one or more media items 112 have been rendered by the one or more user devices 120). In some implementations, the playback adjustment server 130 may receive the previous playback behavior 136 via an API (e.g., from one or more other media item platforms).

The playback adjustment server 130 may determine, based on the playback behavior 136, an adjusted playback of the media item 112a. In some implementations, in response to the previous playback behavior 136 including a user action to decrease a playback speed of the one or more corresponding portions of the one or more media items 112 that were unclear to the user of user device 120 or to the one or more other users, the playback adjustment server 130 may determine an adjusted playback that includes a first decreased playback speed of the one or more portions of the media item 112a that are deemed to be unclear to the user of user device 120. In some implementations, in response to the previous playback behavior 136 including a user action to increase a playback speed of the one or more corresponding portions of the one or more media items 112 that were redundant for the user of user device 120 or to the one or more other users, the playback adjustment server 130 may determine an adjusted playback that includes a first increased playback speed of the one or more portions of the media item 112a that are deemed to be redundant for the user of user device 120. In some implementations, in response to the previous playback behavior 136 including a user action to replay the one or more corresponding portions of the one or more media items 112 that were unclear to the user of user device 120 or to the one or more other users, the playback adjustment server 130 may determine an adjusted playback that includes replaying the one or more portions of the media item 112a that are deemed to be unclear to the user of user device 120. In some implementations, in response to the previous playback behavior 136 including a user action to skip the one or more corresponding portions of the one or more media items 112 that were redundant for the user of user device 120 or to the one or more other users, the playback adjustment server may determine an adjusted playback that includes skipping the one or more portions of the media item 112a that are deemed to be redundant for the user of user device 120.

In some implementations, the previous playback behavior 136 includes one or more searches performed by the one or more users. The one or more searches may be associated with playback of the one or more media items 112 (e.g., one or more temporal locations in the media items 112). Different types of searches may undergo different levels of scrutiny to determine whether the corresponding search is relevant to the media item 112. For example, a search that was performed during playback of a corresponding media item 112 may undergo a low level of scrutiny. A search that was performed while pausing playback of a media item 112 (e.g., after playback of a first portion of a media item 112 and prior to playback of a second portion of the media item 112) may undergo a medium level of scrutiny. A search that was performed after playback of a media item 112 may undergo a high level of scrutiny.

In some implementations, one or more searches performed in association with playback of the media item 112 are determined (e.g., by the playback adjustment server) to be relevant to the media item 112 (e.g., relevant to a portion of the media item 112, relevant to a first temporal location of the media item 112, relevant to a range of time starting at the first temporal location of the media item 112) based on comparing the one or more searches to common searches performed not in association with playback of the media item 112 (e.g., searches not performed during playback of the media item 112). If the one or more searches are similar to common searches performed not in association with playback of the media item 112, the one or more searches may be determined not relevant to the media item 112. In some implementations, one or more searches performed in association with playback of the media item 112 are determined to be relevant to the media item 112 based on content embedding (e.g., content classification, captions, etc.) of the media item 112. In some implementations, probability of the one or more searches being relevant to the media item may be determined based on matches between the one or more searches and the content embedding of the media item 112 (e.g., metadata of the media item 112). For example, if two of four words in a search match the content embedding of the media item 112, the probability of the search being relevant to the media item may be 50%. In some implementations, probability of the one or more searches being relevant to the media item may be determined based on matches with the content embedding of the media item 112 and based on the degree of similarity between the search and common searches performed not in association with the playback of the media item 112. For example, if two of four words in a search match the content embedding of the media item 112 and the search is 50% similar to common searches performed not in association with the playback of the media item 112, the probability of the search being relevant to the media item may be 25%. A search undergoing scrutiny may include comparing the probability of the search being relevant to a threshold probability. For example, low scrutiny may include searches with a probability of 25% relevance to the media item 112 or greater (e.g., a threshold probability of 25%). Medium scrutiny may include searches with a probability of 50% relevance to the media item 112 or greater (e.g., a threshold probability of 50%). High scrutiny may include searches with a probability of 75% relevance to the media item or greater (e.g., a threshold probability of 75%).

In some implementations, the one or more searches are monitored by the playback manager 132 of the playback adjustment server 130. In some implementations, the one or more searches are monitored by the playback behavior component 128 of the user device 120 and are transmitted to the playback adjustment server 130. In some implementations, the one or more searches are received by the playback adjustment server 130 via an API from a third party (e.g., a search engine that receives search queries entered via the user device 120). In some implementations, the playback manager 132 determines whether the searches are relevant. In some implementations, the third party determines whether the searches are relevant.

The searches may be linked to one or more portions of the media item 112 by a function of time. For example, playback behavior 136 of a media item 112 may include an indication of the media item 112 time watermarked with one or more of play events, pause events, replay events, skip events, decrease speed events, increase speed events, search events, etc.

The playback adjustment server 130 may determine that the one or more searches are relevant to a first temporal location (e.g., a duration of time that starts at the first temporal location) of the media item 112 (e.g., one or more portions of the media item 112). The playback adjustment server 130 may determine, based on the playback behavior 136 of one or more relevant searches, an adjusted playback including contextual information to be displayed in conjunction with the media item 112a (e.g., for a portion of the media item 112, at a first temporal location of the media item 112, for a range of time starting at the first temporal location of the media item 112. For example, searches that are determined relevant to the media item 112 may be searches for explanatory information (e.g., information explaining one or more concepts mentioned in the media item 112, one or more definitions of terms mentioned in the media item 112). The contextual information may include explanatory information based on the searches. The rendering of the media item 112a at the default playback may not include displaying of the contextual information.

Figure 3A:
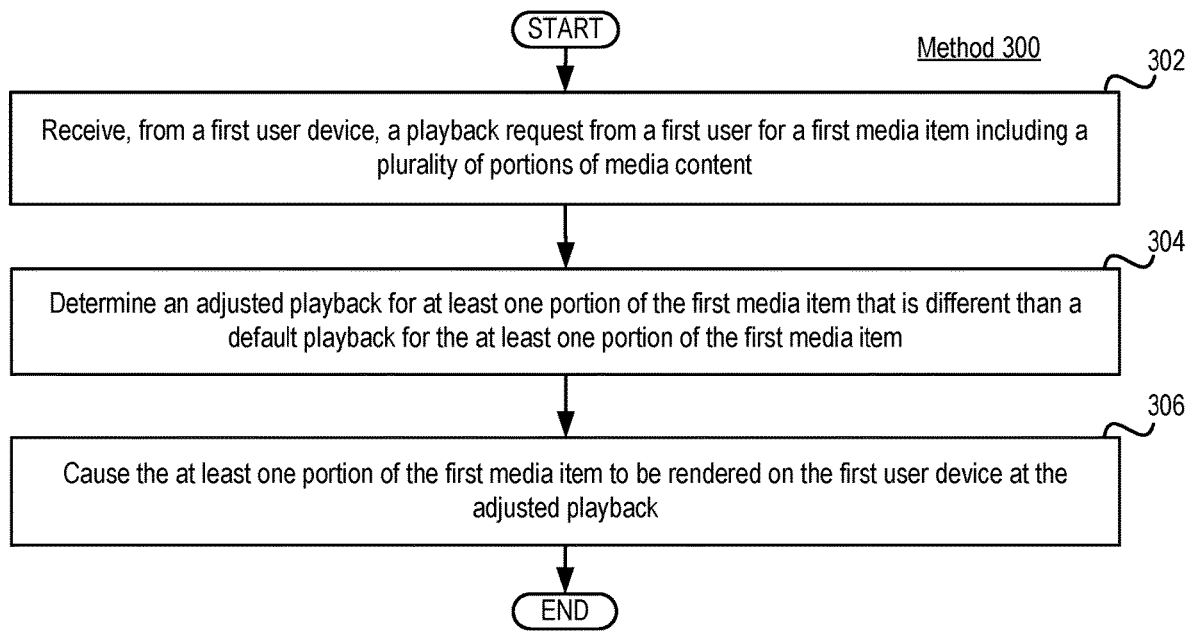
FIGS. 3A-G are flow diagrams illustrating example methods of providing a media item at an adjusted playback, in accordance with implementations of the disclosure.
Figure 3B:
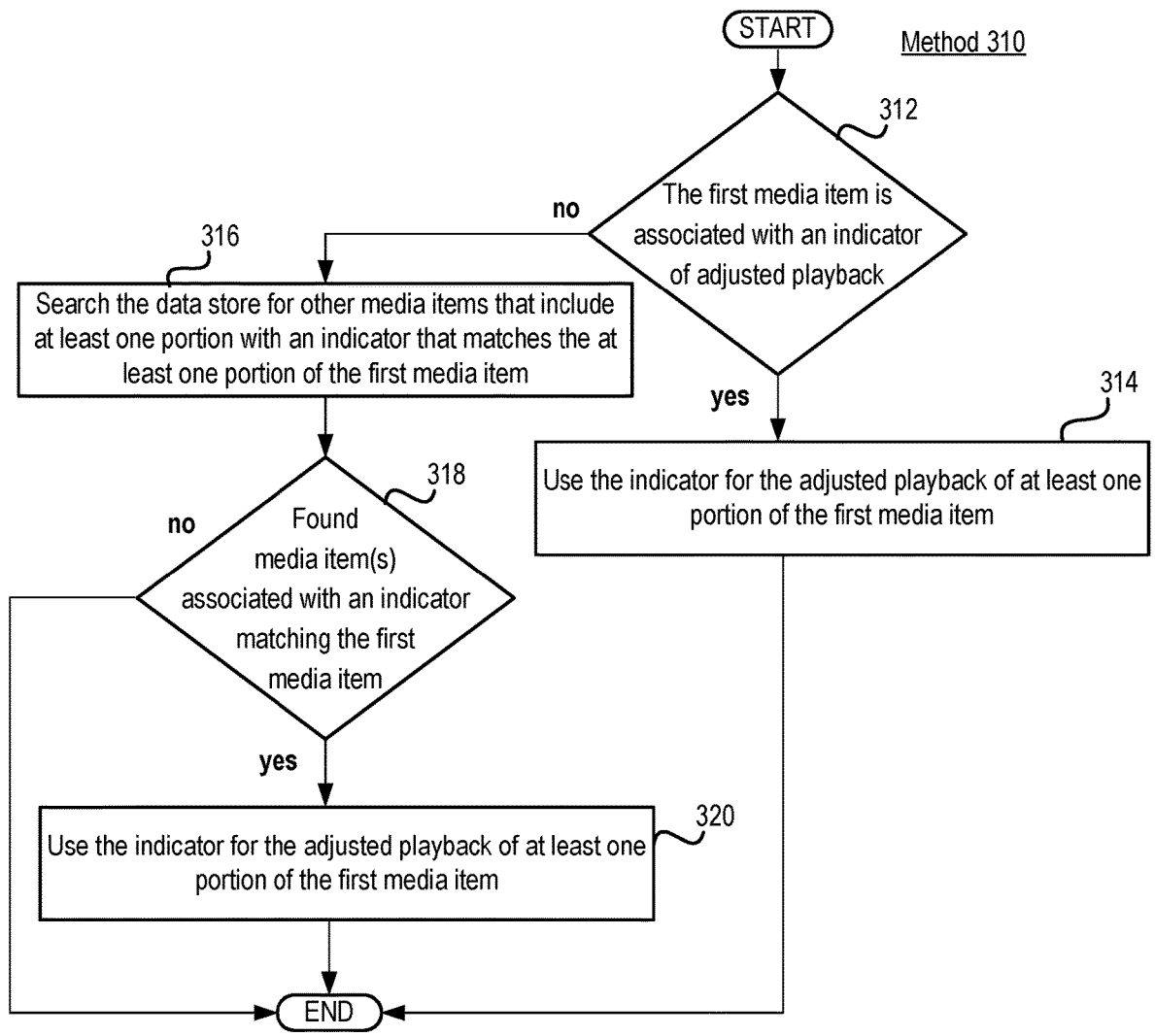
Figure 3C:
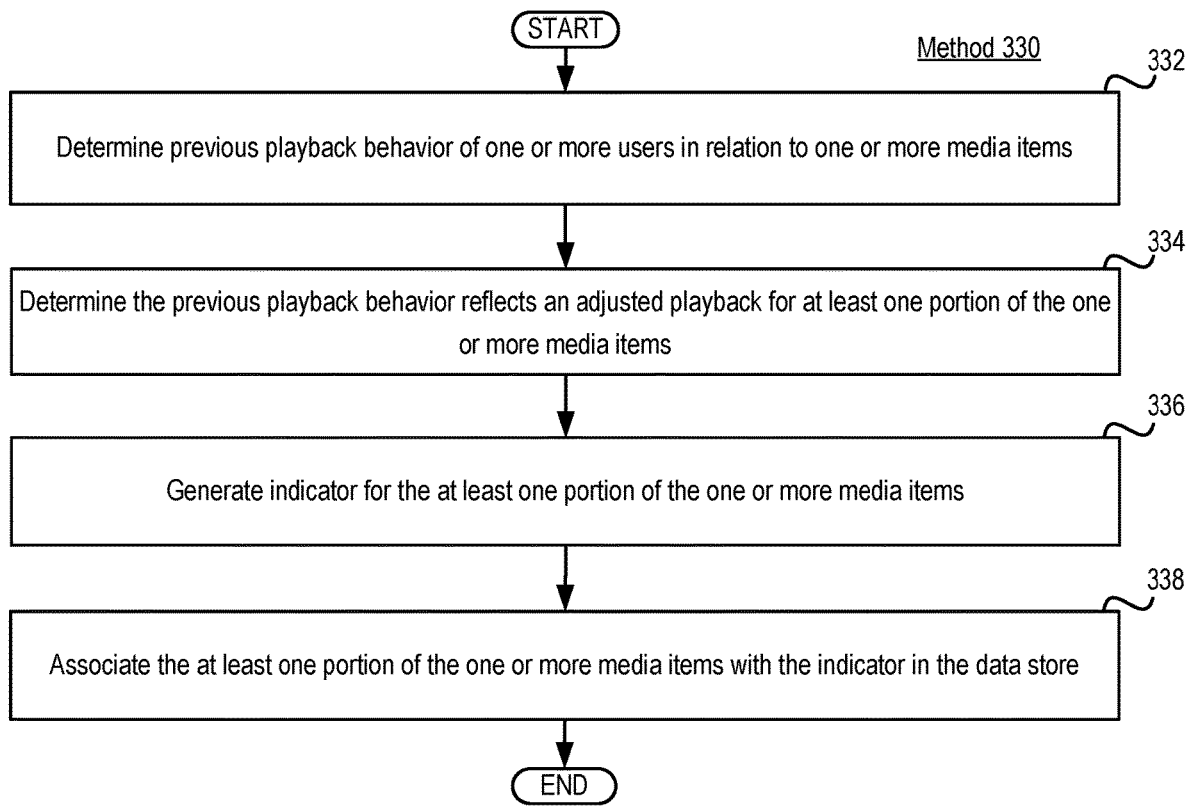

In some implementations, the playback adjustment server 130 may generate adjusted playback instructions (e.g., playback metadata) based on the adjusted playback (see FIG. 3C). The adjusted playback instructions may cause the user device 120 to render the media item 112a at the adjusted playback (e.g., the instructions to render the media item 112a at the adjusted playback, label portions of the media item 112a for adjusted playback, etc.). For example, the adjusted playback instructions may cause the user device 120 to render the media item 112a at a decreased playback speed, render the media item 112a at an increased playback speed, to replay one or more portions of the media item 112a, to skip one or more portions of the media item 112a, and/or to display contextual information during playback.

Returning to FIG. 2, at operation 220, the playback adjustment server 130 may cause the at least one portion of the media item 112a to be rendered at the adjusted playback. In some implementations, the playback adjustment server 130 may transmit media item 112a and adjusted playback instructions (e.g., playback metadata) to user device 120. In some implementations, the playback adjustment server 130 may stream the media item 112a at the adjusted playback to the user device 120. In some implementations, the playback adjustment server 130 may stream the media item 112a to the user device 120 subsequent to transmitting the adjusted playback instructions to the user device 120.

At operation 225, the user device 120 may render the media item 112a at the adjusted playback. In some implementations, the user device 120 renders the media item 112a at the adjusted playback based on the adjusted playback instructions. The rendering component 126 of user device 120 may determine, based on the adjusted playback instructions, actions to take (e.g., increasing or decreasing playback speed, skipping or replaying, displaying contextual information) during playback of one or more portions of the media item 112a and carry out the actions during playback. For example, the rendering component 126 may cause a media player to skip or replay portions of the media item 112a during playback.

In some implementations, the media item 112a is received by the user device 120 at the adjusted playback (e.g., at an adjusted playback speed, skipping or replaying parts, displaying contextual information, etc.) and the user device renders (e.g., displays) the media item 112a at the adjusted playback (e.g., via a graphical user interface, via a media player displayed via the graphical user interface). For example, the media item 112a may be streamed to the user device 120 at an adjusted playback (e.g., in a format where one or more portions are skipped, replayed, etc.) without the user device 120 causing the adjusted playback (e.g., the media player displayed via the user device 120 does not skip, replay, etc. portions of the media item 112a).

In some implementations, at operation 230, the user device 120 may determine playback behavior 136a of the first user in relation to the media item 112a. At operation 235, the playback adjustment server 130 may receive the playback behavior 136a from the user device 120. For example, the user device 120 (e.g., via playback behavior component 128) may determine that a first portion of the media item 112a was skipped during playback, a second portion of the media item 112a was replayed during playback, and a search was performed during a third portion of the media item 112a during playback.

In some implementations, the playback adjustment server 130 determines the playback behavior 136a of the first user in relation to the media item 112a. For example, the playback adjustment server 130 may be streaming the media item 112a to the user device 120, the playback adjustment server 130 may receive user input to skip a first portion of the media item 112a during the streaming, the playback adjustment server may skip the first portion while streaming based on the user input, and the playback adjustment server may determine playback behavior 136a of the first user in relation to the media item 112a based on the user input to skip the first portion of the media item 112a.

At operation 240, the playback adjustment server 130 may generate a recommendation 138 to modify the first media item 112a based on the playback behavior 136a. For example, if the playback behavior 136a included skipping a first portion of the media item 112a, the recommendation 138 may be to modify (e.g., edit) the first media item 112a to skip (e.g., delete) the first portion of the media item.

In some implementations, at operation 245, the playback adjustment server 130 may transmit the recommendation 138 to the content owner device 140. In some implementations, the playback adjustment server 130 may modify the media item 112a based on the recommendation.

In some implementations, at operation 250, the content owner device 140 may modify the media item 112a based on the recommendation 138 (e.g., based on content owner acceptance of the recommendation 138).

In some implementations, at operation 255, the playback adjustment server 130 may receive the modified media item 112a from the content owner device 140. The playback adjustment server 130 may transmit the modified media item 112a to the media item server 110.

FIGS. 3A-G are flow diagrams illustrating example methods of providing a media item 112 at an adjusted playback, in accordance with implementations of the disclosure.

FIGS. 3A-G depict flow diagrams for illustrative examples of methods 300, 310, 330, 340, 350, 370, and 390 for providing a media item 112 at an adjusted playback, in accordance with implementations of the disclosure. Methods 300, 310, 330, 340, and 350 are example methods from the perspective of the playback adjustment system 105 (e.g., one or more of server machine 170, server machine 180, or playback adjustment server 130) (e.g., and/or media item platform or media item server 110). Method 370 is an example method from the perspective of the user device 120. Method 390 is an example method from the perspective of the content owner device 140. Methods 300, 310, 330, 340, 350, 370, and 390 may be performed by processing devices that may include hardware (e.g., circuitry, dedicated logic), software (such as is run on a general purpose computer system or a dedicated machine), or a combination of both. Methods 300, 310, 330, 340, 350, 370, and 390 and each of their individual functions, routines, subroutines, or operations may be performed by one or more processors of the computer device executing the method. In certain implementations, each of methods 300, 310, 330, 340, 350, 370, and 390 may be performed by a single processing thread. Alternatively, each of methods 300, 310, 330, 340, 350, 370, and 390 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. For example, a non-transitory machine-readable storage medium may store instructions which, when executed, cause a processing device (e.g., of playback adjustment system 105, media item server 110, user device 120, playback adjustment server 130, content owner device 140, server machine 170, server machine 180, media item platform, etc.) to perform operations including methods disclosed within. In another example, a system includes a memory to store instructions and a processing device communicably coupled to the memory, the processing device to execute the instructions to perform methods disclosed within. In one implementation, methods 300, 310, 330, 340, and 350 may be performed by playback adjustment system 105 of FIG. 1A and/or FIG. 1B, method 370 may be performed by user device 120 of FIG. 1, and method 390 may be performed by content owner device 140 of FIG. 1.

Referring to FIG. 3A, method 300 may be performed by one or more processing devices of a playback adjustment server 130 for providing a media item 112 at an adjusted playback. Method 300 may be performed by an application or a background thread executing on one or more processing devices on the playback adjustment server 130. In some implementations, one or more portions of method 300 may be performed by one or more of playback adjustment system 105, media item server 110, playback adjustment server 130, or media item platform.

At block 302, the processing device may receive, from a first user device, a playback request for a media item 112. The media item 112 may include one or more portions of media content that are deemed to be unclear to a user and/or one or more second portions that are deemed to be redundant for the user. The playback request may correspond to user input via GUI 400 (e.g., user input via the search bar 440) (see FIG. 4) displayed via the user device 120.

At block 304, the processing device may determine an adjusted playback for at least one portion of the media item 112 that is different than a default playback for the at least one portion of the media item 112. In some implementations, the processing device may determine the adjusted playback by retrieving an indicator of adjusted playback 134 from the data store 160 and providing adjusted playback instructions based on the indicator of adjusted playback 134 (see FIGS. 3B-C). In some implementations, the processing device may determine the adjusted playback by using a trained machine learning model (see FIGS. 3D-E).

The adjusted playback may be based on previous playback behavior of one or more users in relation to one or more media items. The one or more media items may each include one or more corresponding portions of media content that correspond to the one or more portions of media content of the first media item. For example, the one or more corresponding portions of media content and the one or more portions of the media content may feature one or more of a substantially similar (or the same) sequence of frames, substantially similar (or the same) audio stream, appearances by a substantially similar (or the same) character or person, etc. The one or more media items may each include one or more corresponding portions that were unclear to and/or redundant for the user or one or more other users. The previous playback behavior 136 may include user actions to decrease a playback speed, increase a playback speed, replay one or more portions, skip one or more portions, and/or perform one or more searches. For example, the previous playback behavior may include one or more users performing a user action to decrease a playback speed during a portion of a media item 112 where the playback speed is too fast to understand the concept being discussed.

The adjusted playback may modify the playback in a similar manner as the previous playback behavior. For example, the adjusted playback may include decreasing the playback speed during the portion of a media item 112 (e.g., where playback speed was too fast for other users to understand a concept being discussed) where one or more other users decreased playback speed.

At block 306, the processing device may cause the user device to render at least one portion of the first media item at the adjusted playback. Rendering at least one portion of the media item 112 may be via a media player 410 and, according to some implementations, is further described in relation to FIG. 4. For example, the media player 410 may adjust playback by increasing or decreasing playback speed, replaying or skipping portions, and/or displaying contextual information without receiving a user action (e.g., user input via GUI 400) to adjust playback. In some implementations, the processing device may cause the user device 120 to render the media item 112 at the adjusted playback by generating an indicator of adjusted playback based on the adjusted playback 134 (e.g., adjusted playback data) and transmitting the media item 112 and the adjusted playback instructions to the user device 120. The user device 120 may render the media item 112 based on the adjusted playback instructions. In some implementations, the processing device may stream the media item 112 at the adjusted playback to the user device 120 (e.g., without transmitting the adjusted playback instructions to the user device 120).

Referring to FIG. 3B, method 310 may be performed by one or more processing devices of playback adjustment system 105 for providing a media item at an adjusted playback. Method 310 may be used to determine the adjusted playback (e.g., block 304 of FIG. 3A) for rendering at least one portion of a media item corresponding to a playback request. Method 310 may be performed by an application or a background thread executing on one or more processing devices of playback adjustment system 105.

At block 312, processing device branches based on whether the media item (e.g., associated with the playback request) is associated with an indicator of adjusted playback. If so, execution proceeds to block 314, otherwise, execution continues to block 316. The processing device may search a data store 160 to determine whether at least one portion of the media item is associated with an indicator of adjusted playback. Responsive to not finding an indicator of adjusted playback associated with at least one portion of the media item, execution proceeds to block 314. Responsive to finding an indicator of adjusted playback associated with at least one portion of the media item, execution proceeds to block 316.

At block 314, the processing device may use the indicator for the adjusted playback of the at least one portion of the media item. In one implementation, the processing device may generate adjusted playback instructions based on the indicator transmit the instructions and the media item to a user device to cause the user device to render the media item at the adjusted playback.

At block 316, the processing device may search the data store 160 for other media items that include at least one portion with an indicator that matches the at least one portion of the first media item. In some implementations, the processing device searches the data store 160 for one or more media items that have similar (or the same) content information 192 as the media item corresponding to the playback request.

At block 318, processing device branches on whether one or more media items are found that are associated with an indicator matching the media item. If so, execution proceeds to block 320, otherwise, execution of method 310 may end.

At block 320, processing logic uses the indicator for the adjusted playback of at least one portion of the media item.

Referring to FIG. 3C, method 330 may be performed by one or more processing devices of playback adjustment system 105 for providing a media item at an adjusted playback. Method 330 may be used to generate indicators of adjusted playback 134. Method 330 may be performed by an application or a background thread executing on one or more processing devices of playback adjustment system 105.

At block 332, the processing device may determine previous playback behavior 136 of one or more users in relation to one or more media items 112. As discussed above, the playback behavior 136 may include one or more of skipping, replaying, increasing playback speed, decreasing playback speed, performing searches, etc.

At block 334, the processing device may determine the previous playback behavior 136 reflects an adjusted playback 134 for at least one portion of the one or more media items 112. In some implementations, the adjusted playback 134 may differ from a default playback of the one or more media items. In some implementations, the adjusted playback 134 may differ from a previously generated adjusted playback. For example, the previously determined adjusted playback 134 may be to increase playback speed to twice the original playback speed and the adjusted playback reflected in block 334 may be responsive to user input to return the playback speed to the original playback speed.

At block 336, the processing device may generate an indicator of adjusted playback 134 (e.g., playback metadata) for the at least one portion of the one or more media items 112.

At block 338, the processing device may associate the at least one portion of the one or more media items 112 with the indicator of adjusted playback 134 in the data store 160. The processing device may store the media items 112 with the indicator of adjusted playback 134 in the data store 160.

Figure 3D:
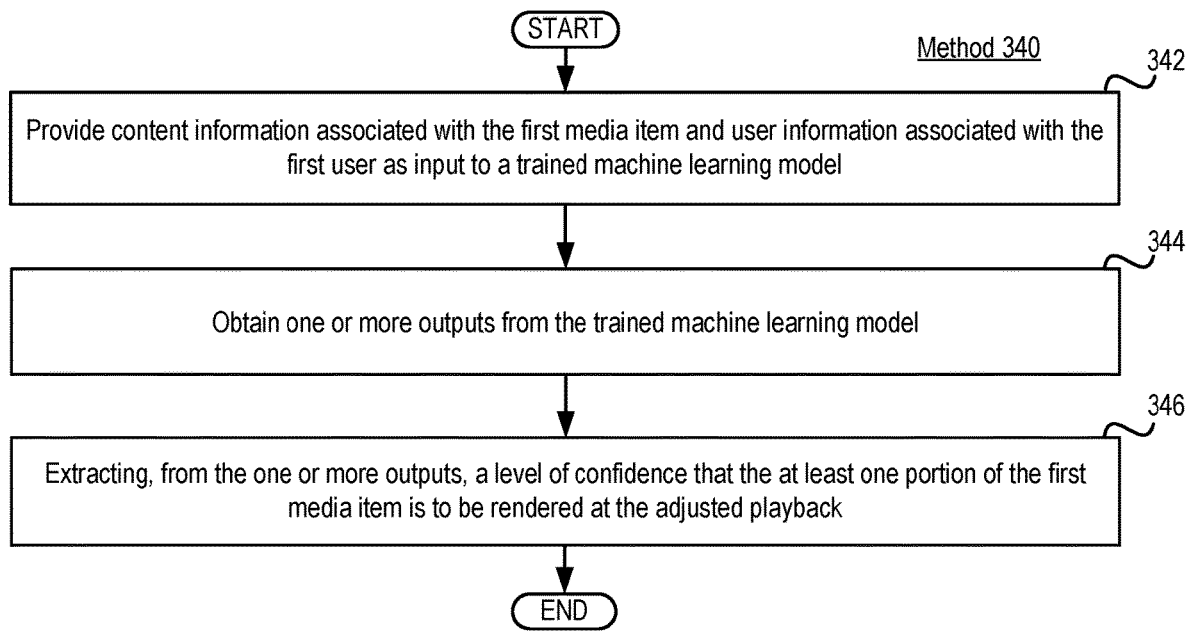

Referring to FIG. 3D, method 370 may be performed by one or more processing devices of playback adjustment system 105 for providing a media item at an adjusted playback. Method 370 may be used to determine the adjusted playback for rendering at least one portion of a media item corresponding to a playback request. Method 370 may be performed by an application or a background thread executing on one or more processing devices of playback adjustment system 105.

At block 342, the processing device may provide content information 192A associated with the media item (e.g., associated with the playback request) and user information 192D associated with the user (e.g., that provided the playback request) as input to a trained machine learning model 190. The processing device may also provide playback behavior information 192C as input to the trained machine learning model 190. The trained machine learning model 190 may be trained by method 350 of FIG. 3E. The method 350 of FIG. 3E may use the training set generated in FIG. 1C.

At block 344, the processing device may obtain one or more outputs from the trained machine learning model 190. The one or more outputs may include an indication of an adjusted playback for at least one portion of the media item (e.g., a prediction of a user preference for an adjusted playback for at least one portion of the media item).

At block 346, the processing device may extract, from one or more outputs, a level of confidence that the at least one portion of the first media item is to be rendered at the adjusted playback. In some implementations, the level of confidence may be a probability that the user will not further adjust the playback of the at least one portion of the media item rendered at the adjusted playback. In some implementations, the level of confidence may be a probability that the user will not further adjust the playback of the media item responsive to the at least one portion of the media item being rendered at the adjusted playback. For example, if nine out of ten users (e.g., that are clustered with the user that sent the playback request) skipped the first 30 seconds of the media item, the processing device may determine with a 90% level of confidence that the user will not further adjust the playback of the first 30 seconds of the media item if the processing device automatically skips the first 30 seconds of the media item.

Figure 3E:
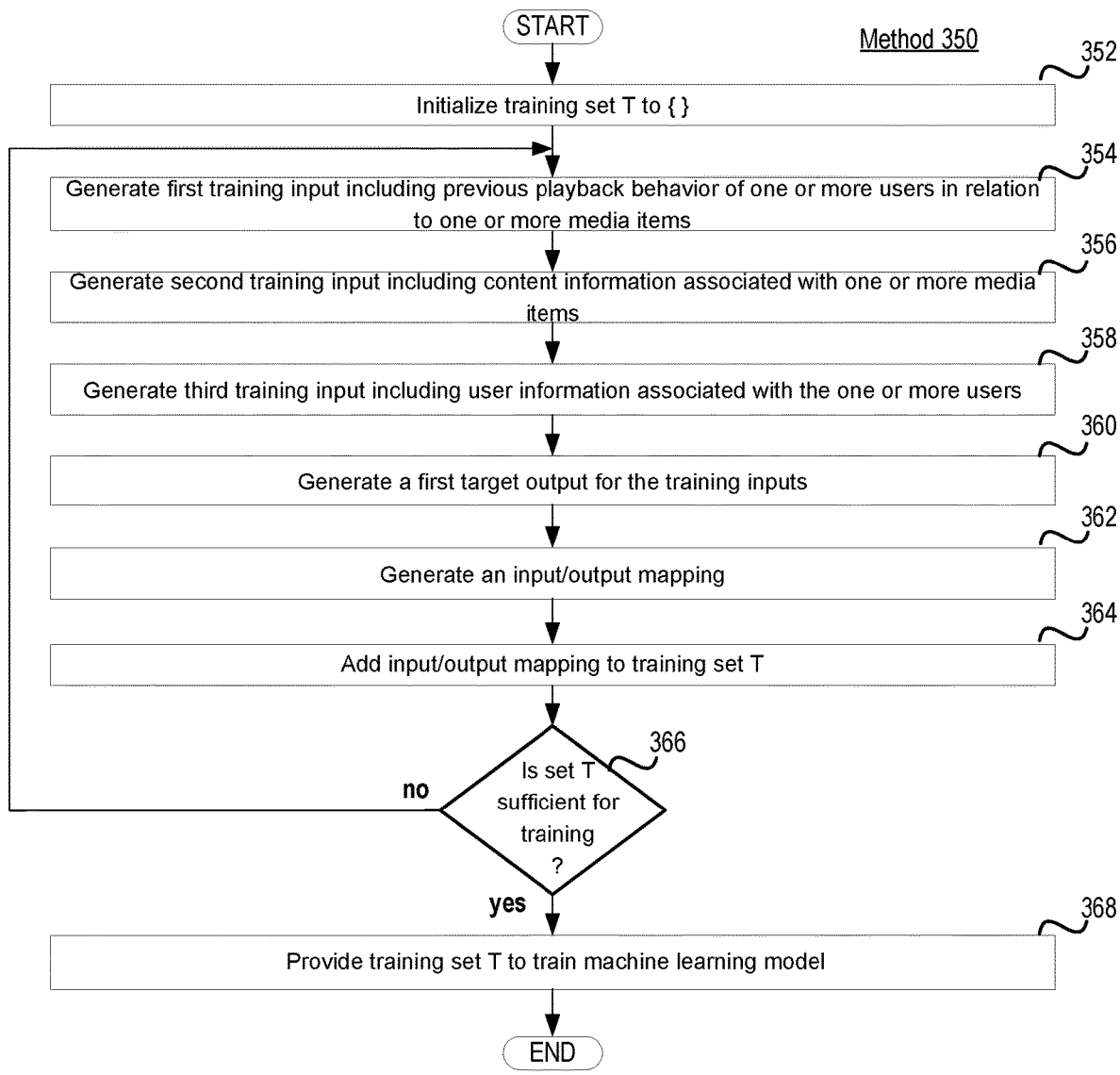

Referring to FIG. 3E, method 350 may be performed by one or more processing devices of playback adjustment system 105 for providing a media item at an adjusted playback. Playback adjustment system 105 may use method 350 to train a machine learning model, in accordance with implementations of the disclosure. The method is performed by processing logic that may include hardware (circuitry, dedicated logic, etc.), software (e.g., instructions run on a processing device), or a combination thereof. In one implementation, some or all the operations of method 350 may be performed by one or more components of system 100 of FIG. 1A and/or FIG. 1B. In other implementations, one or more operations of method 350 may be performed by training set generator 171 of server machine 170 as described with respect to FIGS. 1B-C. It may be noted that components described with respect FIGS. 1A-C may be used to illustrate aspects of FIG. 3E.

Method 350 generates training data for a machine learning model. In some implementations, at block 352 processing logic implementing method 300 initializes a training set T to an empty set.

At block 354, processing logic generates first training input that includes content information 192A associated with a first media item (as described with respect to FIG. 1C). The user devices may be associated with a particular user account. It may be noted that one or more of the categories 194 of content information 192A may also be used as separate training inputs in some implementations. The second training input may include content information associated with additional media items (e.g., content information 192B associated with a second media item as described with respect to FIG. 1C). It may be noted that content information for any number of media items may be used as training input.

At block 356, processing logic generates second training input that includes playback behavior information 192C indicative of user activities associated with one or more users in relation to one or more media items.

At block 358, processing logic generates third training input that includes user information 192D indicative of information associated with the one or more users (e.g., corresponding to the playback behavior information 192C and the playback request).

At block 360, processing logic generates a first target output for one or more of the training inputs (e.g., training inputs one through three). The first target output provides an indication of a preference of a user associated with the user account to render at least one portion of a media item at an adjusted playback.

At block 362, processing logic optionally generates mapping data that is indicative of an input/output mapping. The input/output mapping (or mapping data) may refer to the training input (e.g., one or more of the training inputs described herein), the target output for the training input (e.g., where the target output identifies an indication of a preference of a user to cancel respective transmissions), and an association between the training input(s) and the target output. At block 364, processing logic adds the mapping data generated at block 362 to training set T.

At block 366, processing logic branches based on whether training set T is sufficient for training machine learning model 190. If so, execution proceeds to block 368, otherwise, execution continues back at block 354. It should be noted that in some implementations, the sufficiency of training set T may be determined based simply on the number of input/output mappings in the training set, while in some other implementations, the sufficiency of training set T may be determined based on one or more other criteria (e.g., a measure of diversity of the training examples, accuracy, etc.) in addition to, or instead of, the number of input/output mappings.

At block 368, processing logic provides training set T to train machine learning model 190. In one implementation, training set T is provided to training engine 181 of server machine 180 to perform the training. In the case of a neural network, for example, input values of a given input/output mapping (e.g., numerical values associated with training inputs 192) are input to the neural network, and output values (e.g., numerical values associated with target outputs 196) of the input/output mapping are stored in the output nodes of the neural network. The connection weights in the neural network are then adjusted in accordance with a learning algorithm (e.g., back propagation, etc.), and the procedure is repeated for the other input/output mappings in training set T. After block 368, machine learning model 190 can be trained using training engine 181 of server machine 180. The trained machine learning model 190 may be implemented by playback manager (of playback adjustment server 130) to determine an adjusted playback to be used in rendering at least one portion of a media item.

Figure 3F:
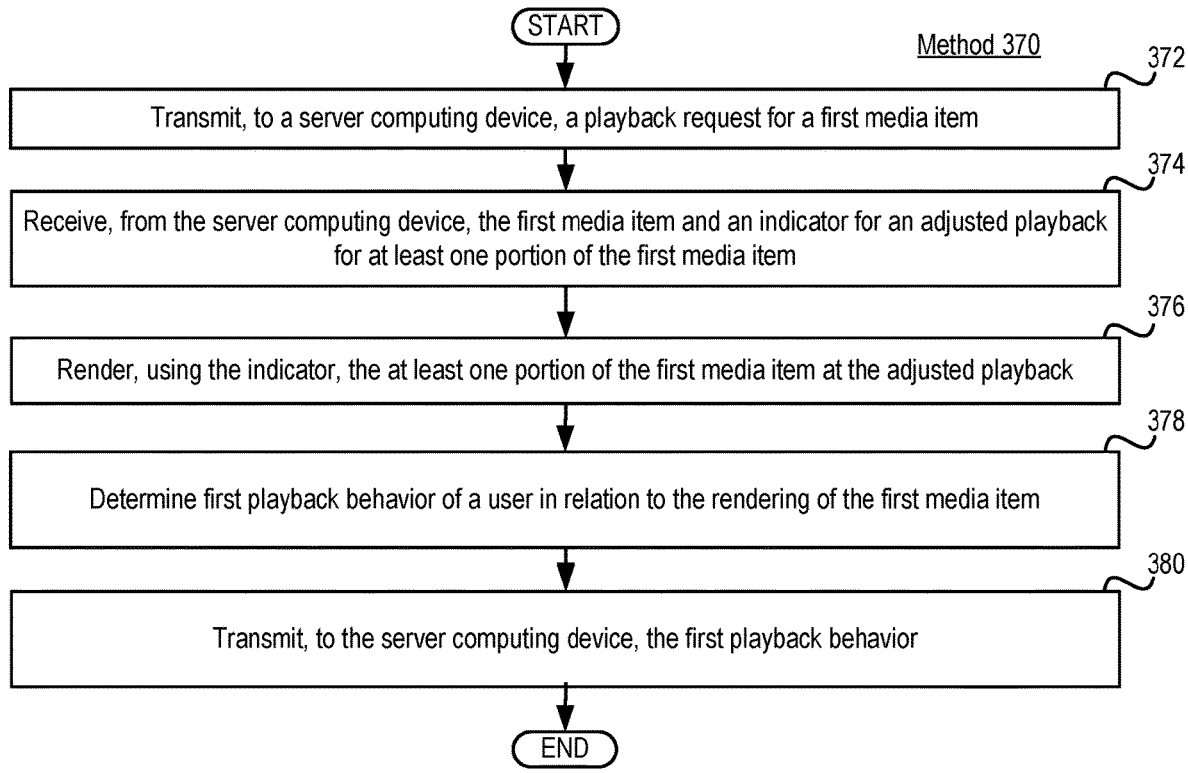

Referring to FIG. 3F, method 370 may be performed by one or more processing devices of a user device 120 for providing a media item at an adjusted playback. Method 370 may be performed by an application or a background thread executing on one or more processing devices on the user device 120.

Method 370 may begin at block 372 where the processing device may transmit, to a server computing device (e.g., playback adjustment server 130), a playback request for a media item. The media item 112 may include one or more portions that are deemed (e.g., by the playback adjustment server 130 based on previous playback behavior 136 of one or more users in relation to one or more media items) to be unclear to a user of the processing device (e.g., user device 120) and/or one or more second portions that are deemed to be redundant for the user. The playback request for a media item 112 may be received via a GUI 400 (see FIG. 4). For example, user input may be received via a search bar 440 displayed via GUI 400 (see FIG. 4) to select a media item 112 corresponding to the playback request.

At block 374, the processing device may receive, from a server computing device, the media item 112 and adjusted playback instructions (e.g., playback metadata). In some implementations, the media item 112 and adjusted playback instructions are received by the processing device prior to playback (e.g., are offlined). In some implementations, the adjusted playback instructions are received prior to playback and the media item 112 is streamed to the processing device during playback. In some implementations, the media item 112 and the adjusted playback instructions are streamed to the processing device during playback.

At block 376, the processing device may render the media item 112 at an adjusted playback based on the adjusted playback instructions. In some implementations, the media player 410 displayed via GUI 400 (see FIG. 4) of the processing device may render the media item 112 at an adjusted playback based on the adjusted playback instructions. In some implementations, the processing device may render the media item 112 at the adjusted playback without requiring network connection to the playback adjustment server 130. In some implementations, the media item 112 (e.g., and adjusted playback instructions) is streamed (e.g., at the adjusted playback) over the network 150 to the processing device and the processing device renders the media item 112 (e.g., as each portion of the media item 112 is received by the processing device).

At block 378, the processing device may determine first playback behavior of the user of processing device (e.g., user device 120) in relation to the media item 112. In some implementations, the first playback behavior includes one or more user actions received via media player 410 (see FIG. 4) to adjust the playback of the media item 112. In some implementations, the first playback behavior includes the adjusted playback (e.g., based on the adjusted playback instructions) and one or more additional user actions received via media player 410 to adjust the playback of the media item 112.

At block 380, the processing device may transmit, to the server computing device, the first playback behavior 136.

Figure 3G:
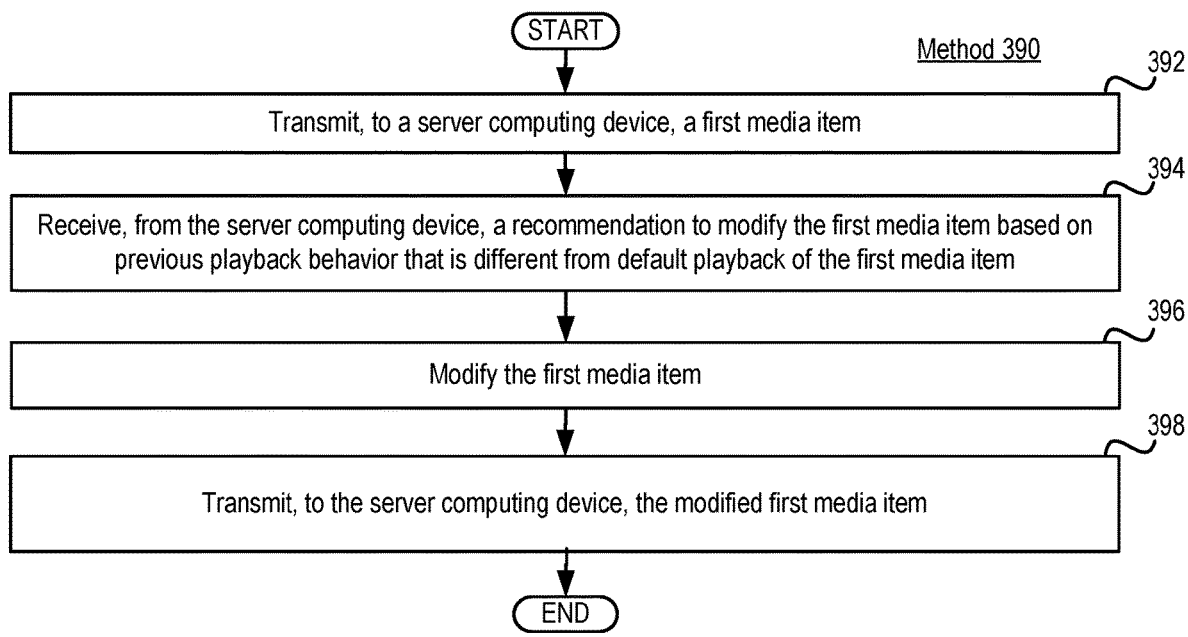

Referring to FIG. 3G, method 390 may be performed by one or more processing devices of a content owner device 140 for providing a media item at an adjusted playback. Method 390 may be performed by an application or a background thread executing on one or more processing devices on the content owner device 140.

Method 390 may begin at block 392 where the processing device may transmit, to a server computing device (e.g., playback adjustment server 130), a media item 112. In some implementations, the media item 112 is created by a content owner (e.g., creator) associated with the processing device. In some implementations, the media item 112 is associated with a content owner that is associated with the processing device. In some implementations, the media item 112 is uploaded by the processing device for playback by one or more users via a media item platform, media item server 110, and/or playback adjustment server 130.

At block 394, the processing device may receive, from the server computing device, a recommendation 138 to modify the media item 112 based on adjusted playback of the media item that is different from default playback of the media item 112.

In some implementations, the recommendation 138 includes a report of user actions performed by one or more users in relation to the playback of the media item 112. For example, the report may indicate that 50% of users increased playback speed at a first portion of the media item 112, 25% of users skipped a second portion of the media item 112, and 75% of users performed a search for a first set of explanatory information during a third portion of the media item 112.

In some implementations, the recommendation 138 includes a proposed modification to the media item 112. For example, the proposed modification may include increasing playback speed at the first portion of the media item 112 and displaying contextual information (e.g., including the explanatory information) at the third portion of the media item 112.

In some implementations, the recommendation 138 includes one or more metrics or analytics. For example, the metrics or analytics may include exit rates indicating the rate that one or more users exited playback (e.g., abandoned playback) at one or more portions of the media item 112.

The recommendation 138 may indicate one or more portions that are one or more of confusing (e.g., frustrating), slow (e.g., boring), unclear, redundant, etc. for one or more users. The recommendation 138 may indicate a history of related searches that users performed in relation to playback of the media item 112 (e.g., during playback, while pausing after playback of a first portion and prior to playback of a second portion, after playback, within a threshold amount of time after playback, within a threshold probability of relevance to the media item 112). The recommendation 138 may highlight points in the media item 112 that lack clarity or cause common confusion. The recommendation 138 may include common comments that have been posted in relation to the media item 112 (e.g., common questions from the comments).

At block 396, the processing device may modify the media item 112 based on the recommendation 138. In some implementations, the content owner or content owner device 140 may determine modifications based on a report, one or more metrics, or analytics of the recommendation 138. The processing device may modify the media item 112 by accepting proposed modifications indicated in the recommendation 138. In some implementations, in response to accepting the proposed modifications, the processing device may modify the media item 112. In some implementations, in response to accepting the proposed modifications, the processing device may cause the playback adjustment server 130 to modify the media item 112. In some implementations, the modified media item is co-created by the content owner. In some implementations, the modified media item is automatically generated by the processing device (e.g., in response to content owner acceptance).

At block 398, the processing device may transmit, to the server computing device (e.g., playback adjustment server 130, media item server 110, media item platform), the modified media item.

Figure 4:
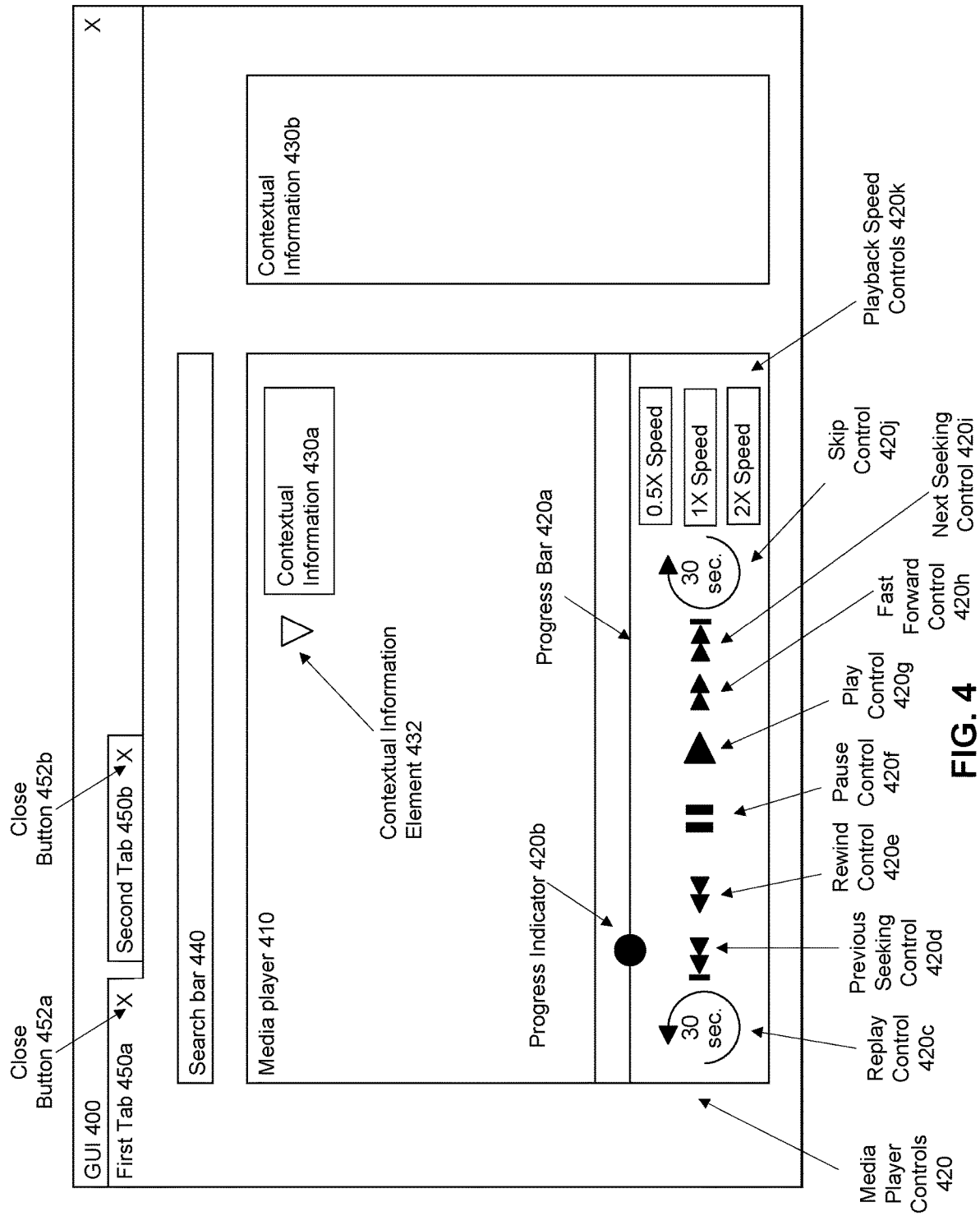
FIG. 4 is an example graphical user interface (GUI) for rendering a media item at an adjusted playback, in accordance with an implementation of the disclosure.

FIG. 4 is an example graphical user interface (GUI) 400 for rendering a media item 112 at an adjusted playback, in accordance with an implementation of the disclosure.

Referring to FIG. 4, a user device 120 may display a GUI 400. The GUI 400 displays a media player 410 for rendering a media item 112. A media item 112 may include one or more of a video item, an audio item, a slideshow that switches slides over time, text that scrolls over time, figures that change over time, etc. In some implementations, media item 112 is any media that has a default playback over time. The default playback may be adjusted by changing playback speed, skipping, replaying, pausing, or displaying contextual information.

In some implementations, the media item 112 includes audio of one or more people speaking (i.e., speakers). For example, the media item may be 112 an educational video, a podcast, lectures, news, comedy shows, sports, movies, etc. The one or more speakers may include a speaker whose speed of speech causes their portions of the media item 112 to be more unclear to or more redundant for users than portions of the media item 112 corresponding to other speakers. The one or more speakers may include a speaker whose form of speech (e.g., slurred speech, pronunciation, accent, dialect, etc.) causes their portions of the media item 112 to be more unclear to users than portions of the media item 112 corresponding to other speakers. The one or more speakers may include a speaker whose subject matter (e.g., at a level of difficulty to understand) causes their portions of the media item 112 to be more unclear to (e.g., the users not familiar with the subject matter) or more redundant for (e.g., the users are already familiar with the subject matter) users than portions of the media item 112 corresponding to other speakers.

The media player 410 may include media player controls 420. One or more user actions received via the media player controls 420 may adjust the playback of the media item 112. User actions via the media player controls 420 may be stored as playback behavior 136 and may be transmitted to the playback adjustment server 130. In response to receiving a media item 112 and adjusted playback instructions from the playback adjustment server 130, the user device 120 may cause the media player controls 420 to adjust playback of the media item 112 based on the adjusted playback instructions without receiving user actions (e.g., other than selecting to initiate playback of the media item 112). In some implementations, user actions may override one or more portions of the adjusted playback caused by the adjusted playback instructions. In some implementations, one or more portions of the adjusted playback (e.g., displaying contextual information 430) may override user actions.

The media player controls 420 may include a progress bar 420a and a progress indicator 420b. The progress bar 420a may indicate the temporal duration of the media item 112 (e.g., how long the media item is) and the progress indicator 420b may indicate a point in time relative to the temporal duration of the media item 112 (e.g., progress of playback, point of current playback, point where playback will resume or start, etc.). In response to user action of selecting the progress indicator 420b and dragging the progress indicator 420b to the left may result in replaying one or more portions of the media item 112. In response to user action of selecting the progress indicator 420b and dragging the progress indicator 420b to the right may result in skipping one or more portions of the media item 112.

The media player controls may include one or more of replay control 420c, previous seeking control 420d, rewind control 420e, pause control 420f, play control 420g, fast forward control 420h, next seeking control 420i, skip control 420j, or playback speed controls 420k. Upon user action of selecting replay control 420c, the progress indicator 420b may move to the left and the media player 410 may replay one or more portions of the media item 112 (e.g., replay the last 30 seconds of the media item 112). In response to user action of selecting the previous seeking control 420d, the media player 410 may move playback of (e.g., replay) the media item 112 to a set point (e.g., the beginning, a previous bookmarked position) of the media item 112. Upon user action of selecting the rewind control 420e, the media player 410 may rewind the media item 112 (e.g., move the progress indicator 420b to the left) at a constant rate until the progress indicator 420b arrives at the beginning of the media item 112 or the media player 410 receives a second user action via the rewind control 420e (e.g., releasing the rewind control 420e, selecting the rewind control 420e again). In response to user action of selecting the pause control 420f, the media player 410 may pause playback of the media item 112 (e.g., stop playback) until user interaction with the play control 420g. In response to user action of selecting the play control 420g, the media player 410 may initiate or resume playback of the media item 112. In response to user action of selecting fast forward control 420h, the media player may fast forward the media item 112 (e.g., move the progress indicator 420b to the right) at a constant rate until the progress indicator 420b arrives at the end of the media item 112 or the media player 410 receives a second user action via the fast forward control 420h (e.g., releasing the fast forward control 420h, selecting the fast forward control 420h again). In response to user action of selecting the next seeking control 420i, the media player may move playback of (e.g., skip) the media item 112 to a set point (e.g., the end, a next bookmarked position) of the media item 112. In response to selecting the skip control 420j, the progress indicator 420b may move to the right and the media player 410 may skip one or more portions of the media item 112 (e.g., skip 30 seconds of the media item 112). In response to user action of selecting the playback speed controls 420k, the media player may increase or decrease playback speed of the media item 112. For example, user action may include selection 0.5× speed, 1× speed, or 2× speed.

In response to one or more portions of the media item 112 being unclear, a user action may include performing one or more searches. In some implementations, the one or more searches may be performed via the search bar 440. In some implementations, the media player 410 may be located on a first tab 450a of the GUI 400 and upon user action, the second tab 450b may be displayed and the one or more searches may be performed via the second tab 450b. The first tab 450a and the second tab 450b may include a corresponding close button 452. In response to a user action of selecting the close button 452a corresponding to the first tab 450a, playback of the media item 112 via the media player 410 may be stopped (e.g., playback may be abandoned, the media player 410 may be closed along with the first tab 450a).

The playback behavior 136 (e.g., viewing history, scrolling history, search history relative to playback of media items) of the user and/or one or more additional users may be used to provide search suggestions and/or ranking of search results via search bar 440 and/or second tab 450b. For example, if the media player 410 is currently performing playback of a media item 112 on game theory, the search term of "stag hunt" may be interpreted as a game theory concept (two player game) rather than being hunting related. In some implementations, the GUI 400 may display an interface (e.g., via search bar 440, via second tab 450b) suggesting common searches by other users. In some implementations, the GUI 400 may display, via the contextual information 430 or contextual information element 432, common searches by other users and/or explanatory information in response to the common searches.

Contextual information 430 may display explanatory information based on one or more searches that are relevant to the media item 112. In some implementations, the contextual information 430a may be displayed as overlay information on the media item 112. In some implementations, the contextual information 430b may be displayed to the side of the media player 410. In some implementations, a contextual information element 432 may be displayed in conjunction with (e.g., overlaid on, to the side of) the media item 112 being rendered via the media player 410. The contextual information element 432 may be a pop up, a drop down menu, an element that displays more information in response to user action. In response to user action (e.g., selection of, hovering over, etc.) with respect to the contextual information element 432, contextual information may be displayed (e.g., overlaid on the media player 410, to the side of the media player 410). The contextual information 430 may include explanations or definitions of concepts that are referenced by the media item 112 but not introduced (e.g., concepts that are mentioned in passing but not explained). The contextual information 430 and contextual information element 432 may provide explanatory information for the user so that the user is not required to access the network 150 and/or a second tab 450b for explanation of unclear portions of the media item 112.

The contextual information 430 may include one or more of text, figures, hyperlinks (e.g., hyperlinks to other media items 112), definitions, explanatory information, etc. The contextual information 430 may be displayed during playback of one or more portions that were unclear (e.g., previous playback included decreasing speed, replaying, pausing, performing one or more searches, etc.).

Figure 5:
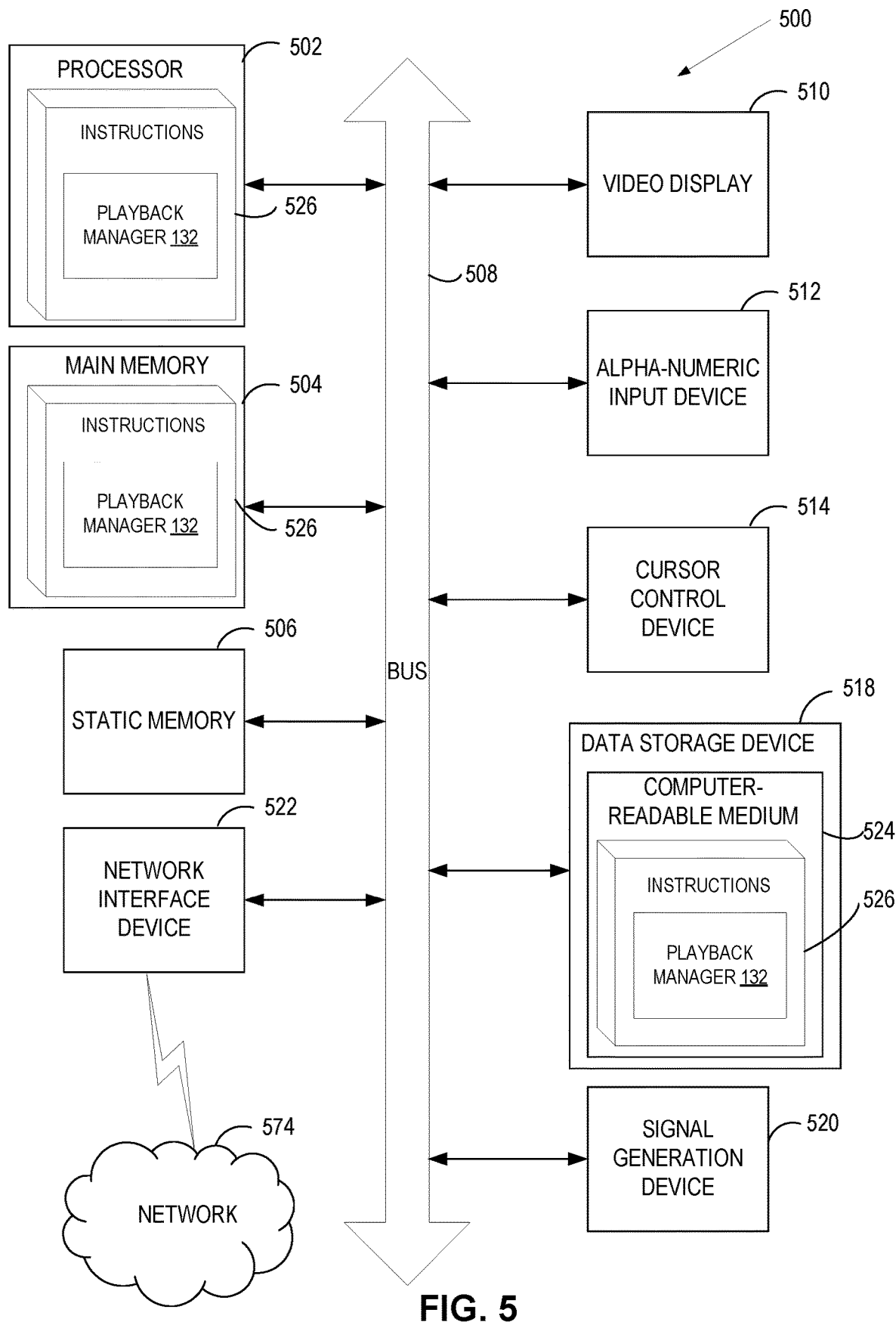
FIG. 5 is a block diagram illustrating one implementation of a computer system, in accordance with an implementation of the disclosure.

FIG. 5 is a block diagram illustrating one implementation of a computer system, in accordance with an implementation of the disclosure. In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

In some implementations, data storage device 516 may include a non-transitory computer-readable storage medium 524 on which may store instructions 526 encoding any one or more of the methods or functions described herein, including instructions encoding the playback manager 132 of FIG. 1 and for implementing method 300.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "identifying," "determining," "causing," "decreasing," "increasing," "replaying," "skipping," "performing," "clustering," "generating," "transmitting," "providing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 330, and 360 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving, by a server computing device from a first user device, a playback request from a first user for a first media item including a plurality of portions of media content;
determining, by the server computing device, an adjusted playback for a first portion of the first media item that is different than a default playback for the first portion of the first media item, wherein the determining the adjusted playback is based on previous playback behavior associated with one or more users via one or more user devices in relation to one or more media items that each included one or more portions of media content corresponding to the first portion of the first media item, wherein the previous playback behavior is associated with one or more searches performed by the one or more users via the one or more user devices to obtain explanatory information comprising one or more definitions of terms associated with the one or more portions responsive to playback of the one or more portions, wherein each term corresponding to the one or more definitions of terms is from the playback of the one or more portions via the one or more user devices, and wherein the one or more searches for the one or more definitions of terms are responsive to playback of at least a corresponding portion of the one or more media items; and causing, by the server computing device, the first portion of the first media item to be rendered on the first user device at the adjusted playback, wherein causing the first portion of the first media item to be rendered on the first user device at the adjusted playback comprises:

determining that the one or more searches are relevant to the first portion of the first media item; and causing contextual information to be displayed in conjunction with the first portion of the first media item while the first portion of the first media item is playing, wherein the contextual information includes the explanatory information associated with the first portion of the first media item.

2. The method of claim 1, wherein the determining the adjusted playback comprises:

determining whether the first media item is associated with an indicator of adjusted playback for any of the plurality of portions of media content by searching a data store;

responsive to determining that the first media item is associated with the indicator of adjusted playback, using the indicator for the adjusted playback of the first portion of the first media item; and responsive to determining that the first media item is not associated with the indicator of adjusted playback:

searching the data store for other media items that include at least one portion of media content associated with the indicator of adjusted playback that matches the first portion of the first media item; and responsive to finding one or more other media items that include the at least one portion of media content associated with the indicator of adjusted playback that matches the first portion of the first media item, using the indicator for the adjusted playback of the first portion of the first media item.

3. The method of claim 2 further comprising populating the data store, wherein the populating comprises:

determining, by the server computing device, the previous playback behavior of the one or more users in relation to the one or more media items;

determining the previous playback behavior reflects the adjusted playback for the at least one portion of media content of the one or more media items;

generating the indicator of adjusted playback for the at least one portion of media content of the one or more media items; and associating the at least one portion of media content of the one or more media items with the indicator of adjusted playback in the data store.

4. The method of claim 1, wherein the determining the adjusted playback comprises:

providing content information associated with the first media item and user information associated with the first user as input to a trained machine learning model;

obtaining one or more outputs from the trained machine learning model; and extracting, from the one or more outputs, a level of confidence that the first portion of the first media item is to be rendered at the adjusted playback.

5. The method of claim 4 further comprising training a machine learning model to generate the trained machine learning model, wherein the training comprises:

generating training data for the machine learning model, wherein generating the training data comprises:

generating first training input comprising the previous playback behavior of the one or more users in relation to the one or more media items;

generating second training input comprising content information associated with the one or more media items;

generating third training input comprising user information associated with the one or more users; and generating a first target output for the first training input, the second training input, and the third training input, wherein the first target output comprises an indication of adjusted playback for one or more portions of the one or more media items; and providing the training data to train the machine learning model on (i) a set of training inputs comprising the first training input, the second training input, and the third training input, and (ii) a set of target outputs comprising the first target output.

6. The method of claim 1, wherein the previous playback behavior comprises a user action to decrease a playback speed of one or more corresponding portions of the one or more media items, wherein the method further comprises causing a corresponding portion of the first media item to be rendered on the first user device at a first decreased playback speed.

7. The method of claim 1, wherein the previous playback behavior further comprises a user action to increase a playback speed of one or more corresponding portions of the one or more media items, wherein the method further comprises causing a corresponding portion of the first media item to be rendered on the first user device at an increased playback speed.

8. The method of claim 1, wherein the previous playback behavior comprises a user action to replay one or more corresponding portions of the one or more media items, wherein the method further comprises causing a corresponding portion of the first media item to be replayed.

9. The method of claim 1, wherein the previous playback behavior comprises a user action to skip one or more corresponding portions of the one or more media items, wherein the method further comprises causing a corresponding portion of the first media item to be skipped.

10. The method of claim 1 further comprising determining that the one or more searches are relevant to a first temporal location of the first media item, wherein the causing of the contextual information to be displayed in conjunction with the first portion of the first media item is at the first temporal location based on the one or more searches, and wherein rendering the first media item at the default playback does not include displaying of the contextual information.

11. The method of claim 1 further comprising clustering, based on similar playback behavior, the first user and a second user in a first cluster, wherein the one or more users comprise the second user and the one or more media items comprise the first media item, wherein the previous playback behavior comprises second playback behavior of the second user in relation to the first portion of the first media item, wherein the adjusted playback of the first portion is determined based on the second playback behavior of the second user in relation to the first portion.

12. The method of claim 1 further comprising:
receiving, from a content owner device associated with a content owner, the first media item;
generating a recommendation to modify the first media item based on the previous playback behavior;
transmitting, to the content owner device, the recommendation to modify the first media item; and
receiving, from the content owner device, a modified first media item.

13. A non-transitory machine-readable storage medium storing instructions which, when executed cause a processing device of a server computing device to perform operations comprising:
receiving, from a first user device, a playback request from a first user for a first media item including a plurality of portions of media content;
determining an adjusted playback for a first portion of the first media item that is different than a default playback for the first portion of the first media item, wherein the determining the adjusted playback is based on previous playback behavior associated with one or more users via one or more user devices in relation to one or more media items that each included one or more portions of media content corresponding to the first portion of the first media item, wherein the previous playback behavior is associated with one or more searches performed by the one or more users via the one or more user devices to obtain explanatory information comprising one or more definitions of terms associated with the one or more portions responsive to playback of the one or more portions via the one or more user devices, wherein each term corresponding to the one or more definitions of terms is from the playback of the one or more portions, and wherein the one or more searches for the one or more definitions of terms are responsive to playback of at least a corresponding portion of the one or more media items; and
causing the first portion of the first media item to be rendered on the first user device at the adjusted playback, wherein causing the first portion of the first media item to be rendered on the first user device at the adjusted playback comprises:
determining that the one or more searches are relevant to the first portion of the first media item; and
causing contextual information to be displayed in conjunction with the first portion of the first media item while the first portion of the first media item is playing, wherein the contextual information includes the explanatory information associated with the first portion of the first media item.

14. The non-transitory machine-readable storage medium of claim 13, wherein the operations further comprise determining that the one or more searches are relevant to a first temporal location of the first media item, wherein the causing of the contextual information to be displayed in conjunction with the first portion of the first media item is at the first temporal location based on the one or more searches, wherein rendering the first media item at the default playback does not include displaying of the contextual information.

15. The non-transitory machine-readable storage medium of claim 13 further comprising:
receiving, from a content owner device associated with a content owner, the first media item;
generating a recommendation to modify the first media item based on the previous playback behavior;
transmitting, to the content owner device, the recommendation; and
receiving, from the content owner device, a modified first media item based on the recommendation.

16. A system comprising:
a memory to store instructions; and
a processing device communicably coupled to the memory, the processing device being configured to execute the instructions to:
receive, from a first user device, a playback request from a first user for a first media item including a plurality of portions of media content;
determine an adjusted playback for first portion of the first media item that is different than a default playback for the first portion of the first media item, wherein the processing device is to determine the adjusted playback based on previous playback behavior associated with one or more users via one or more user devices in relation to one or more media items that each included one or more portions of media content corresponding to the first portion of the first media item, wherein the previous playback behavior is associated with one or more searches performed by the one or more users via the one or more user devices to obtain explanatory information comprising one or more definitions of terms associated with the one or more portions responsive to playback of the one or more portions via the one or more user devices, wherein each term corresponding to the one or more definitions of terms is from the playback of the one or more portions, and wherein the one or more searches for the one or more definitions of terms are responsive to playback of at least a corresponding portion of the one or more media items; and
cause the first portion of the first media item to be rendered on the first user device at the adjusted playback, wherein to cause the first portion of the first media item to be rendered on the first user device at the adjusted playback, the processing device is to:
determine that the one or more searches are relevant to the first portion of the first media item; and
cause contextual information to be displayed in conjunction with the first portion of the first media item while the first portion of the first media item is playing, wherein the contextual information includes the explanatory information associated with the first portion of the first media item.

17. The system of claim 16, wherein to determine the adjusted playback, the processing device is to:
determine whether the first media item is associated with an indicator of adjusted playback for any of the plurality of portions of media content by searching a data store;
responsive to determining that the first media item is associated with the indicator of adjusted playback, use the indicator for the adjusted playback of the first portion of the first media item; and
responsive to determining that the first media item is not associated with the indicator of adjusted playback:
search the data store for other media items that include at least one portion of media content associated with the indicator of adjusted playback that matches the first portion of the first media item; and
responsive to finding one or more other media items that include the at least one portion of media content associated with the indicator of adjusted playback that matches the first portion of the first media item, use the indicator for the adjusted playback of the first portion of the first media item.

18. The system of claim 17, wherein the processing device is to populate the data store, wherein to populate the data store, the processing device is to:
- determine the previous playback behavior of the one or more users in relation to the one or more media items;
- determine the previous playback behavior reflects the adjusted playback for the at least one portion of media content of the one or more media items;
- generate the indicator of adjusted playback for the at least one portion of the one or more media items; and
- associate the at least one portion of media content of the one or more media items with the indicator of adjusted playback in the data store.

19. The system of claim 16, wherein to determine the adjusted playback, the processing device is to:
- provide content information associated with the first media item and user information associated with the first user as input to a trained machine learning model;
- obtain one or more outputs from the trained machine learning model; and
- extract, from the one or more outputs, a level of confidence that the first portion of the first media item is to be rendered at the adjusted playback.

20. The system of claim 19, wherein the processing device is further to train a machine learning model to generate the trained machine learning model, wherein to train the machine learning model, the processing device is to:
- generate training data for the machine learning model, wherein generating the training data comprises:
  - generate first training input comprising the previous playback behavior of the one or more users in relation to the one or more media items;
  - generate second training input comprising content information associated with the one or more media items;
  - generate third training input comprising user information associated with the one or more users; and
  - generate a first target output for the first training input, the second training input, and the third training input, wherein the first target output comprises an indication of adjusted playback for one or more portions of the one or more media items; and
- provide the training data to train the machine learning model on (i) a set of training inputs comprising the first training input, the second training input, and the third training input, and (ii) a set of target outputs comprising the first target output.

* * * * *